US011391841B2

(12) United States Patent
Bondy et al.

(10) Patent No.: US 11,391,841 B2
(45) Date of Patent: Jul. 19, 2022

(54) SPATIAL PROFILING SYSTEM AND METHOD

(71) Applicant: Baraja Pty Ltd., Lindfield West (AU)

(72) Inventors: Federico Collarte Bondy, Lindfield West (AU); Cibby Pulikkaseril, Lindfield West (AU)

(73) Assignee: Baraja Pty Ltd., North Ryde (AU)

( * ) Notice: Subject to any disclaimer, the term of this patent is extended or adjusted under 35 U.S.C. 154(b) by 415 days.

(21) Appl. No.: 16/680,039

(22) Filed: Nov. 11, 2019

(65) Prior Publication Data

US 2020/0081128 A1    Mar. 12, 2020

Related U.S. Application Data

(63) Continuation of application No. 15/277,235, filed on Sep. 27, 2016, now Pat. No. 10,527,727.

(30) Foreign Application Priority Data

Sep. 28, 2015 (AU) ................................ 2015903943
Nov. 17, 2015 (AU) ................................ 2015904733

(51) Int. Cl.
  *G01S 17/89* (2020.01)
  *G01S 7/497* (2006.01)
  (Continued)

(52) U.S. Cl.
  CPC ............ *G01S 17/89* (2013.01); *G01S 7/4817* (2013.01); *G01S 7/4818* (2013.01); *G01S 7/497* (2013.01);
  (Continued)

(58) Field of Classification Search
  None
  See application file for complete search history.

(56) References Cited

U.S. PATENT DOCUMENTS 3,825,340 A   7/1974 Debart
3,953,667 A   4/1976 Layton et al.
(Continued)

FOREIGN PATENT DOCUMENTS

DE   4427352   1/1996
EP   0164181   12/1985
(Continued)

OTHER PUBLICATIONS

"Australian Application Serial No. 2016333145, Notice of Acceptance dated Mar. 20, 2020", 3 pgs.
(Continued)

*Primary Examiner* — Eric L Bolda
(74) *Attorney, Agent, or Firm* — Schwegman Lundberg & Woessner, P.A.

(57) ABSTRACT

Described herein is a system, a method and a processor-readable medium for spatial profiling. In one arrangement, the described system includes a light source configured to provide outgoing light having at least one time-varying attribute at a selected one of multiple wavelength channels, the at least one time-varying attribute includes either or both of (a) a time-varying intensity profile and (b) a time-varying frequency deviation, a beam director configured to spatially direct the outgoing light into one of multiple directions in two dimensions into an environment having a spatial profile, the one of the multiple directions corresponding to the selected one of the multiple wavelength channels, a light receiver configured to receive at least part of the outgoing light reflected by the environment, and a processing unit configured to determine at least one characteristic associated with the at least one time-varying attribute of the reflected light at the selected one of the multiple wavelengths for estimation of the spatial profile of the environment associated with the corresponding one of the multiple directions.

20 Claims, 10 Drawing Sheets

(51) Int. Cl.
　　　G01S 17/42　　　(2006.01)
　　　G01S 7/481　　　(2006.01)
　　　G01S 7/4911　　(2020.01)
　　　G01S 17/34　　　(2020.01)
　　　G01S 17/32　　　(2020.01)
　　　G01S 17/58　　　(2006.01)

(52) U.S. Cl.
　　　CPC ............ *G01S 7/4911* (2013.01); *G01S 17/32* (2013.01); *G01S 17/34* (2020.01); *G01S 17/42* (2013.01); *G01S 17/58* (2013.01)

(56) References Cited

U.S. PATENT DOCUMENTS

| | | |
|---|---|---|
| 5,583,683 A | 12/1996 | Scobey |
| 5,694,130 A | 12/1997 | Suzuki et al. |
| 5,877,851 A | 3/1999 | Stann et al. |
| 6,031,658 A | 2/2000 | Riza |
| 6,147,760 A | 11/2000 | Geng |
| 6,236,666 B1 | 5/2001 | Mirov et al. |
| 6,263,127 B1 | 7/2001 | Dragone et al. |
| 6,339,661 B1 | 1/2002 | Kokkelink et al. |
| 6,359,681 B1 | 3/2002 | Housand et al. |
| 6,377,720 B1 | 4/2002 | Kokkelink |
| 6,687,036 B2 | 2/2004 | Riza |
| 7,016,098 B2 | 3/2006 | Giles et al. |
| 7,397,980 B2 | 7/2008 | Frisken |
| 7,532,311 B2 | 5/2009 | Henderson et al. |
| 7,804,056 B2 | 9/2010 | Bishop |
| 7,916,278 B2 | 3/2011 | Smith |
| 7,986,397 B1 | 7/2011 | Tiemann et al. |
| 8,072,582 B2 | 12/2011 | Meneely |
| 8,159,680 B2 | 4/2012 | Robinson et al. |
| 8,179,594 B1 | 5/2012 | Tidwell et al. |
| 8,440,952 B2 | 5/2013 | Jalali et al. |
| 8,559,015 B2 | 10/2013 | Kuramoto |
| 8,701,482 B2 | 4/2014 | Tsadka et al. |
| 9,246,589 B2 | 1/2016 | Koonen et al. |
| 9,435,957 B1 | 9/2016 | Zhong et al. |
| 9,684,076 B1 | 6/2017 | Feldkhun |
| 10,527,727 B2 | 1/2020 | Bondy et al. |
| 2002/0126945 A1 | 9/2002 | Konishi et al. |
| 2003/0043058 A1 | 3/2003 | Jamieson et al. |
| 2003/0043363 A1 | 3/2003 | Jamieson et al. |
| 2003/0161047 A1 | 8/2003 | Lee et al. |
| 2003/0223748 A1 | 12/2003 | Stowe et al. |
| 2004/0086214 A1 | 5/2004 | Huang et al. |
| 2004/0135716 A1 | 7/2004 | Wootton |
| 2006/0124838 A1 | 6/2006 | Baker et al. |
| 2007/0272841 A1 | 11/2007 | Wiklof |
| 2009/0002680 A1 | 1/2009 | Ruff et al. |
| 2011/0106324 A1 | 5/2011 | Tsadka et al. |
| 2011/0199621 A1 | 8/2011 | Robinson et al. |
| 2012/0001981 A1 | 1/2012 | Wu et al. |
| 2013/0166113 A1 | 6/2013 | Dakin et al. |
| 2013/0242400 A1 | 9/2013 | Chen |
| 2014/0233013 A1 | 8/2014 | Sakimura et al. |
| 2015/0086198 A1 | 3/2015 | Frisken et al. |
| 2015/0160340 A1 | 6/2015 | Grauer et al. |
| 2015/0192677 A1 | 7/2015 | Yu et al. |
| 2015/0226853 A1 | 8/2015 | Seo et al. |
| 2017/0090031 A1 | 3/2017 | Bondy et al. |
| 2018/0031680 A1 | 2/2018 | Lee et al. |
| 2019/0361097 A1 | 11/2019 | Bondy et al. |

FOREIGN PATENT DOCUMENTS

| | | |
|---|---|---|
| EP | 0811855 | 12/1997 |
| EP | 1052868 | 11/2000 |
| EP | 1065551 A2 | 1/2001 |
| EP | 2212717 | 8/2010 |
| EP | 2866051 A1 | 4/2015 |
| EP | 3081956 A1 | 10/2016 |
| JP | 08-189965 A | 7/1996 |
| JP | 2010-048810 A | 3/2010 |
| JP | 2011-021930 A | 2/2011 |
| JP | 2011-099756 A | 5/2011 |
| JP | 2012-154863 A | 8/2012 |
| JP | 2013-160769 A | 8/2013 |
| WO | WO-2009046717 | 4/2009 |
| WO | WO-2011036553 | 3/2011 |
| WO | 2011112367 | 9/2011 |
| WO | 2012112683 | 8/2012 |
| WO | 2013119858 | 8/2013 |
| WO | WO 2015018836 | 2/2015 |
| WO | WO-2015/059244 A1 | 4/2015 |
| WO | WO-2016075140 A1 | 5/2016 |
| WO | WO-2016097409 A2 | 6/2016 |
| WO | WO-2017054036 A1 | 4/2017 |
| WO | WO-2018090085 A1 | 5/2018 |

OTHER PUBLICATIONS

"European Application Serial No. 16849943.2, Response filed Aug. 7, 2020 to Office Action dated Apr. 9, 2020", 21 pgs.
"European Application Serial No. 17871153.7, Office Action dated Jun. 17, 2020", 1 pg.
"European Application Serial No. 17871153.7, Response filed Dec. 17, 2020 to Office Action dated Jun. 17, 2020", 14 pgs.
"Japanese Application Serial No. 2018-515111, Office Action dated Jan. 5, 2021", (w/ English Translation), 6 pgs.
"Japanese Application Serial No. 2018-515111, Written Argument and Amendment filed Nov. 9, 2020 to Office Action dated Jul. 31, 2020", (w/ English Translation), 25 pgs.
U.S. Appl. No. 15/277,235, filed Sep. 27, 2016, Spatial Profiling System and Method.
U.S. Appl. No. 16/461,769, filed May 16, 2019, An Optical Beam Director.
"U.S. Appl. No. 16/461,769, Restriction Requirement dated Aug. 9, 2021", 7 pgs.
"Australian Application No. 2020203638, Examination Report No. 1 dated Jun. 2, 2021", (dated Jun. 2, 2021), 5 pgs.
"Australian Application No. 2021202660, Examination Report No. 1 dated Jun. 24, 2021", (dated Jun. 24, 2021), 5 pgs.
"Australian Application No. 2021202661, Examination Report No. 1 dated Jun. 24, 2021", (dated Jun. 24, 2021), 6 pgs.
"Australian Application No. 2021202664, Examination Report No. 1 dated Jun. 24, 2021", (dated Jun. 24, 2021), 6 pgs.
"Australian Application No. 2021202666, Examination Report No. 1 dated Jun. 24, 2021", (dated Jun. 24, 2021), 5 pgs.
"Australian Application Serial No. 2017361118, Examination Report No. 1 dated Feb. 12, 2021", 8 pgs.
"Japanese Application Serial No. 2018-515111, Written Opinion filed Apr. 20, 2021 in response to Office Action dated Jan. 5, 2021", (w/ English Translation), 17 pgs.
Amann, M. C., et al., "Phase noise limited resolution of coherent LIDAR using widely tunable laser diodes", Electronics Letters, 28(18), (1992), 1694-1696.
Amoruso, S., et al., "Development of a tunable IR lidar system", Optics and Lasers in Engineering, 37(5), (May 2002), 521-532.
"U.S. Appl. No. 15/277,235, Corrected Notice of Allowability dated Oct. 16, 2019", 2 pgs.
"U.S. Appl. No. 15/277,235, Notice of Allowance dated Aug. 22, 2019", 8 pgs.
"U.S. Appl. No. 15/277,235, Response to Restriction Requirement dated Jan. 29, 2019 filed Mar. 6, 2019", 9 pgs.
"U.S. Appl. No. 15/277,235, Restriction Requirement dated Jan. 29, 2019", 5 pgs.
"U.S. Appl. No. 16/461,769, Preliminary Amendment filed May 16, 2019", 7 pgs.
"U.S. Appl. No. 16/461,769, Supplemental Preliminary Amendment filed May 22, 2019", 6 pgs.
"Australian Application No. 2016904674, International-type search for provisional patent application dated Dec. 14, 2016", (dated Dec. 14, 2016), 10 pgs.
"European Application No. 16849943.2, Extended European Search Report dated Apr. 4, 2019", (dated Apr. 4, 2019), 8 pgs.

(56) References Cited

OTHER PUBLICATIONS

"International Application No. PCT/AU2017/051255, International Preliminary Report on Patentability completed Feb. 18, 2019", (dated Feb. 18, 2019), 25 pgs.

"International Application No. PCT/AU2017/051255, International Search Report and Written Opinion dated Jan. 19, 2018", (dated Jan. 19, 2018), 17 pgs.

Dieckmann, A., "FMCW-LIDAR with tunable twin-guide laser diode", Electronics Letters, vol. 30, No. 4, Feb. 17, 1994, (Feb. 17, 1994), 308-309.

Gao, Shuang, et al., "Complex-optical-field lidar system for range and vector velocity measurement", Optics Express, vol. 20, No. 23, Nov. 5, 2012, (Nov. 5, 2012), 25867-25875.

Pierrottet, Diego, et al., "Linear FMCW Laser Radar for Precision Range and Vector Velocity Measurements", Paper, Hampton, Virginia (2008), (2008), 9 pgs.

Quack, Niels, et al., "Development of an FMCW LADAR Source Chip using MEMS-Electronic-Photonic Heterogeneous Integration", University of California, Berkeley; University of Illinois at Urbana-Champaign (2014), (2014), 4 pgs.

Tsai, Jui-Che, et al., "1×N 2 wavelength-selective switch with two cross-scanning one-axis analog micromirror arrays in a 4-f optical system", Journal of Lightwave Technology, vol. 24, No. 2, 2006, pp. 897-903, (Feb. 2006), 897-903.

Tsai, Jui-Che, et al., "High fill-factor two-axis analog micromirror array for 1XN2 wavelength-selective switches", Micro Electro Mechanical Systems, 2004, 17th IEEE International Conference on MEMS, IEEE, 2004, pp. 101-104, (2004), 101-104.

Watanabe, Toshio, et al., "Low-loss wavelength routing optical switch consisting of small matrix switch and cyclic arrayed-waveguide gratings for colorless add/drop", Japanese Journal of Applied Physics 53, 08MB02 (2014), (Jul. 2, 2014), 5 pgs.

Wu, Ming C., et al., "Optical MEMS for lightwave communication", Journal of Lightwave Technology, vol. 24, No. 12, 2006, pp. 4433-4454, (Dec. 2006), 4433-4454.

"European Application Serial No. 17871153.7, Supplementary European Search Report dated May 29, 2020", 7 pgs.

"Japanese Application Serial No. 2018-515111, Office Action dated Jul. 31, 2020", (w/ English Translation), 14 pgs.

U.S. Appl. No. 15/277,235 U.S. Pat. No. 10,527,727, filed Sep. 27, 2016, Spatial Profiling System and Method.

"Australian Application Serial No. 2016333145, Examination Report dated Jan. 28, 2020", 2 pgs.

"Australian Application Serial No. 2016333145, Response filed Feb. 21, 2020 to Examination Report dated Jan. 28, 2020", 13 pgs.

"European Application Serial No. 16849943.2, Office Action dated Apr. 9, 2020", 6 pgs.

SPATIAL PROFILING SYSTEM AND METHOD

CLAIM OF PRIORITY

This application is a continuation application and claims the benefit of priority of U.S. patent application Ser. No. 15/277,235, filed Sep. 27, 2016, which claims the benefit of priority of Australia Patent Application No. 2015903943, filed on Sep. 28, 2015, and of Australia Patent Application No. 2015904733, filed on Nov. 17, 2015, the benefit of priority of each of which is claimed hereby, and which are incorporated by reference herein in their entirety.

FIELD OF THE INVENTION

The present invention relates to a system and method for estimating a spatial profile of an environment.

BACKGROUND OF THE INVENTION

Spatial profiling refers to the three-dimensional mapping of an environment as viewed from a desired field of view. Each point or pixel in the field of view is associated with a distance to form a three-dimensional representation of the environment. Spatial profiles may be useful in identifying objects and/or obstacles in the environment, thereby facilitating automation of tasks.

One technique of spatial profiling involves sending light into an environment in a specific direction and detecting any light reflected back from that direction, for example, by a reflecting surface in the environment. The reflected light carries relevant information for determining the distance to the reflecting surface. The combination of the specific direction and the distance forms a point or pixel in the three-dimensional representation of the environment. The above steps may be repeated for multiple different directions to form other points or pixels of the three-dimensional representation, thereby estimating the spatial profile of the environment within a desired field of view.

Reference to any prior art in the specification is not, and should not be taken as, an acknowledgment or any form of suggestion that this prior art forms part of the common general knowledge in any jurisdiction or that this prior art could reasonably be expected to be understood, regarded as relevant and/or combined with other pieces of prior art by a person skilled in the art.

SUMMARY OF THE INVENTION

According to a first aspect of the invention there is provided a spatial profiling system including:

a light source configured to provide outgoing light having at least one time-varying attribute at a selected one of multiple wavelength channels, the at least one time-varying attribute includes either or both of (a) a time-varying intensity profile and (b) a time-varying frequency deviation;

a beam director configured to spatially direct the outgoing light into one of multiple directions in two dimensions into an environment having a spatial profile, the one of the multiple directions corresponding to the selected one of the multiple wavelength channels;

a light receiver configured to receive at least part of the outgoing light reflected by the environment; and a processing unit configured to determine at least one characteristic associated with the at least one time-varying attribute of the reflected light for estimation of the spatial profile of the environment associated with the corresponding one of the multiple directions, wherein the light receiver is configured to inhibit detection of non-reflected light based on a difference in wavelength or modulation between the outgoing light and the non-reflected light.

Inhibiting detection of the non-reflected light may include selecting the selected one of the multiple wavelengths based on a predetermined or randomised sequence of wavelength channels.

Inhibiting detection of the non-reflected light may include de-correlating the received light from the outgoing light and incoherently mixing the de-correlated light with a sample of the outgoing light.

Inhibiting detection of the non-reflected light may include performing optical self-heterodyne of the received light with a sample of the outgoing light during a time window within which the light source is configured to provide the sampled light at the selected one of multiple wavelength channels.

Inhibiting detection of the non-reflected light may include imposing a code modulation on to the time-varying intensity profile of the outgoing light according to a coding sequence, and wherein the at least one characteristic includes an autocorrelation of the reflected light with the coding sequence. The coding sequence may include a Barker code. Alternatively the code modulation may include a slowly-varying Barker code and a fast-varying Barker code.

The coding sequence may be adjustable for avoidance of interference with another spatial mapping system.

The time-varying intensity profile may include periodic modulation at a predetermined frequency. The periodic modulation may include sinusoidal modulation, and wherein the at least one characteristics may include a phase shift of the sinusoidally modulated reflected light. Alternatively, the periodic modulation includes multiple frequency components, and wherein the at least one characteristics includes at least one of: (a) a delay of an envelope of a beat tone arising from the multiple frequency components to facilitate a coarser and longer-range distance estimation and (b) a phase shift of the periodically modulated reflected light to facilitate a finer and shorter-range distance determination. Alternatively or additionally the time-varying intensity may profile include a chirped sinusoidal modulation.

In one configuration, the light source is configured to provide additional outgoing light having the same or a different time-varying attribute(s) at additionally selected one or more of the multiple wavelength channels in a sequential manner, the beam director is configured to direct the additional outgoing light into the corresponding one or more of the multiple directions in the sequential manner, and the processing unit is configured to determine the at least one characteristic associated with the same or the different time-varying attributes of the reflected light at the additionally selected one or more of the multiple wavelength channel, for estimation of the spatial profile of the environment associated with the corresponding one or more of the multiple directions.

In this configuration, the sequential manner includes the predetermined sequence. Alternatively, the sequential manner includes the randomised sequence.

The beam director may include reversible optics for (a) spatially directing an outgoing collinear beam from the light source into the multiple directions and (b) spatially directing the reflected light in multiple reversed directions into an incoming collinear beam. The reversible optics may include a spatially cross-dispersive module. The spatially cross-dispersive module may include two spatially dispersive elements in an orthogonal arrangement, each being arranged to steer the outgoing light into respective one of the two dimensions. The two spatially dispersive elements may include a photonic crystal structure.

The system may further include non-reversible optics for muting the outgoing light from the light source to the beam director, and for routing the reflect light from the beam director to the light receiver. The non-reversible optics may include an optical circulator.

The system may further include an optical coupler or beam splitter following the light source The beam director may include collimating optics for routing reflected light collected by bean director to the light receiver along a path not shared by path taken by the outgoing light.

In one configuration, the beam director is one of multiple beam directors, each of which is (a) optically coupled to the light source and the light receiver, and (b) configured to direct the outgoing light to a respective environment having a respective spatial profile in response to a respective subset of the multiple wavelength channels. In this configuration, the beam directors are each fibre-optically coupled to the light source and the light receiver. Alternatively, the light receiver is one of multiple light receivers, and the beam directors are each optically coupled to the light source and the respective one of the multiple light receivers.

The light source may include an etalon module for providing temperature-related information to the processing unit, and the processing unit may be configured to control the light source based on the temperature-related information.

The beam director may include a cavity for obtaining environmental-related information based on intensity of light reflected from the cavity and received by the light receiver.

In one configuration, the time-varying frequency deviation may include a linear change in optical frequency. The time-varying frequency deviation may include a sawtooth or triangular waveform. The processing unit may be further configured to determine at least another characteristic of the reflected light for estimation of a speed of a target in the environment.

According to a second aspect of the invention there is provided a spatial profiling method including the steps of:

providing, by a light source, outgoing light having at least one time-varying attribute at a selected one of multiple wavelength channels, the at least one time-varying attribute includes either or both of (a) a time-varying intensity profile and (b) a time-varying frequency deviation;

spatially directing, by a beam director, the outgoing light into one of multiple directions in two dimensions into an environment having a spatial profile, the one of the multiple directions corresponding to the selected one of the multiple wavelength channels;

receiving, by a light receiver, at least part of the outgoing light reflected by the environment; and determining, by the processing unit, at least one characteristic associated with the at least one time-varying attribute of the reflected light for estimation of the spatial profile of the environment associated with the corresponding one of the multiple directions, wherein the light receiver is configured to inhibit detection of non-reflected light based on a difference in wavelength or modulation between the outgoing light and the non-reflected light.

According to a third aspect of the invention there is provided a processor-readable medium including instructions, which when executed by a processing unit in a spatial profiling system, cause the system to:

provide, by a light source, outgoing light having at least one time-varying attribute at a selected one of multiple wavelength channels, the outgoing light being spatially directed by a beam director into one of multiple directions in two dimensions into an environment having a spatial profile, the at least one time-varying attribute includes either or both of (a) a time-varying intensity profile and (b) a time-varying frequency deviation, the one of the multiple directions corresponding to the selected one of the multiple wavelength channels; and determine, by the processing unit, at least one characteristic associated with the at least one time-varying attribute of at least part of the outgoing light reflected by the environment and received by a light receiver for estimation of the spatial profile of the environment associated with the corresponding one of the multiple directions, wherein the light receiver is configured to inhibit detection of non-reflected light based on a difference in wavelength or modulation between the outgoing light and the non-reflected light.

Further aspects of the present invention and further embodiments of the aspects described in the preceding paragraphs will become apparent from the following description, given by way of example and with reference to the accompanying drawings.

DETAILED DESCRIPTION OF EMBODIMENTS

In this specification, "intensity" means optical intensity and, unless otherwise stated, is interchangeable with "optical power".

Described herein is a spatial profiling system. The described system provides an estimation of the spatial profile of an environment as seen from one or more particular perspectives, by determining the distance of any reflecting surface, such as that of an object or obstacle, within a solid angle or field of view for each perspective. The described system may be useful in monitoring relative movements or changes in the environment.

For example, in the field of autonomous vehicles (land, air, water, or space), the described system can estimate from the vehicle's perspective a spatial profile of the traffic conditions, including the distance of any objects, such as an obstacle or a target ahead. As the vehicle moves, the spatial profile as viewed from the vehicle at another location may change and may be re-estimated. As another example, in the field of docking, the described system can estimate from a container ship's perspective a spatial profile of the dock, such as the closeness of the container ship to particular parts of the dock, to facilitate successful docking without collision with any parts of the dock. As yet another example, in the field of line-of-sight communication, such as free-space optical or microwave communication, the described system may be used for alignment purposes. Where the transceiver has moved or is moving, it may be continuously tracked so as to align the optical or microwave beam.

Figure 1A:
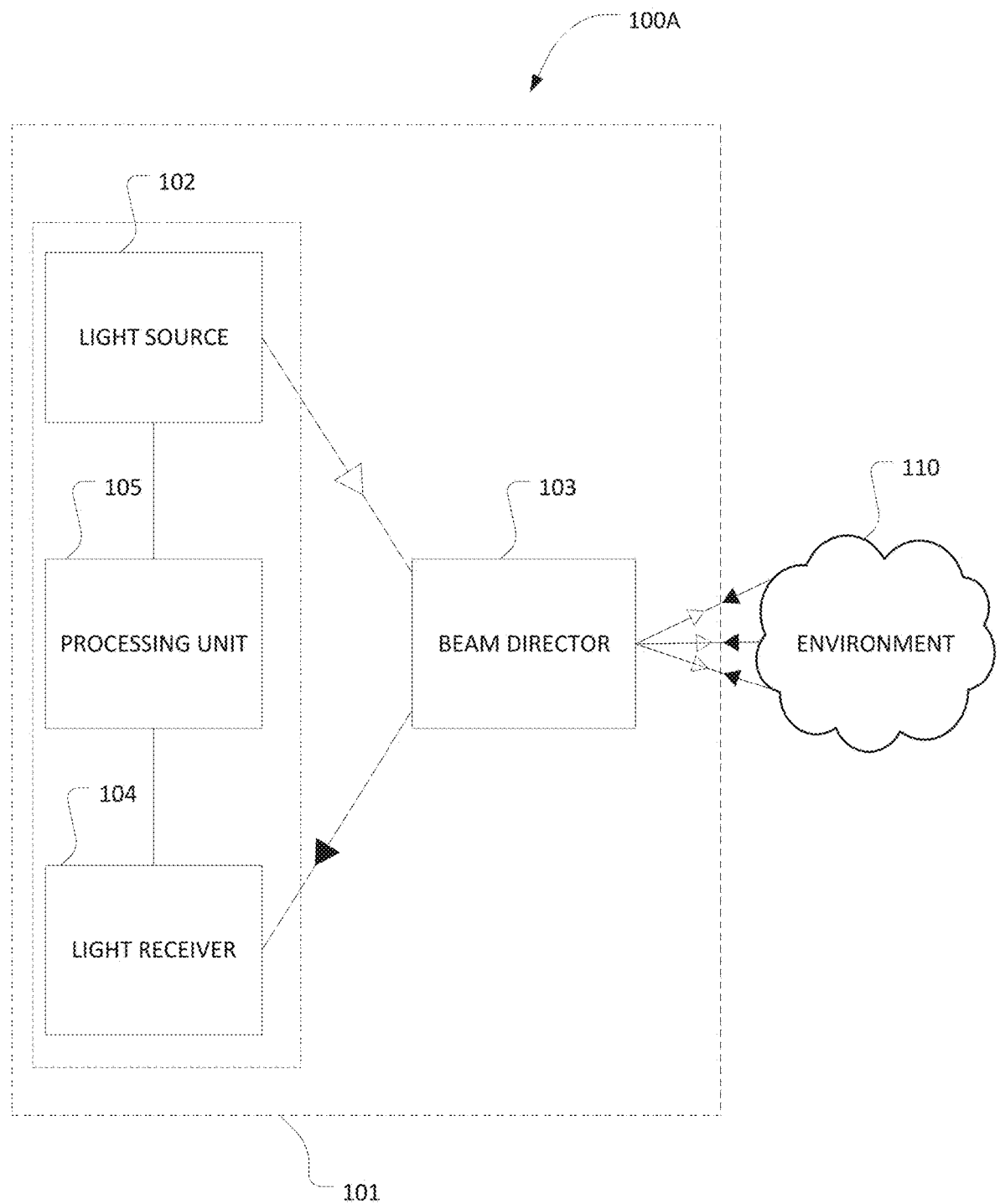
FIGS. 1A, 1B and 1C each illustrate an arrangement of a spatial profiling system.
Figure 1B:
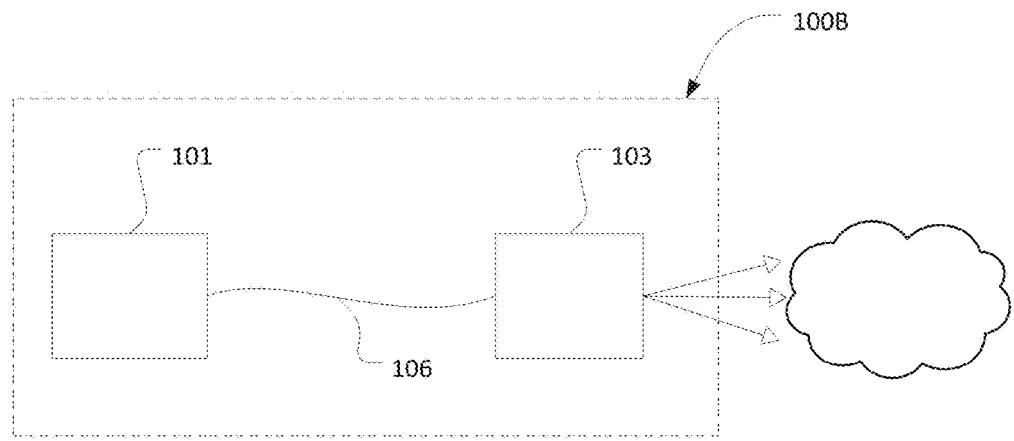

As further examples, the applicable fields include, but are not limited to, industrial measurements and automation, site surveying, military, safety monitoring and surveillance, robotics and machine vision, printing, projectors, illumination, attacking and/or flooding and/or jamming other laser and IR vision systems FIG. 1A illustrates an arrangement of a spatial profiling system 100A according to the present disclosure. The system 100A includes a light source 102, a beam director 103, a light receiver 104 and a processing unit 105. In the arrangement of FIG. 1, outgoing light from the light source 102 is directed by the beam director 103 in a direction in two dimensions into an environment 110 having a spatial profile. If the outgoing light hits an object or a reflecting surface, at least part of the outgoing light may be reflected (represented in solid arrows), e.g. scattered, by the object or reflecting surface back to the beam director 103 and received at the light receiver 104. The processing unit 105 is operatively coupled to the light source 102 for controlling its operations. The processing unit 105 is also operatively coupled to the light receiver 104 for determining the distance to the reflecting surface, by determining the round-trip distance travelled by the reflected light.

The light source 102, the beam director 103, the light receiver 104 may be optically coupled to one another via free-space optics, and/or optical waveguides such as optical fibres or optical circuits in the form of 2D or 3D waveguides. As described further below, outgoing light from the light source 102 is provided to the beam director 103 for directing into the environment. Any reflected light collected by the beam director 103 may be directed to the light receiver 104. In one arrangement, light from the light source 102 is also provided to the light receiver 104 for optical processing purposes via a direct light path (not shown) from the light source 102 to the light receiver 104. For example, the light from the light source 102 may first enter a sampler (e.g. a 90/10 fibre-optic coupler), where a majority portion (e.g. 90%) of the light is provided to the beam director 103 and the remaining sample portion (e.g. 10%) of the light is provided to the light receiver 104 via the direct path. In another example, the light from the light source 102 may first enter an input port of an optical switch and exit from one of two output ports, where one output port directs the light to the beam director 103 and the other output port re-directs the light to the light receiver 104 at a time determined by the processing unit 105. The light receiver 104 is configured to inhibit detection of non-reflected light based on a difference in wavelength or modulation between the outgoing light and the non-reflected light. Non-reflected light includes light that does not arise from the reflection of the outgoing light, and hence should not assist the processing unit 105 in determining the distance of the reflecting surface. This inhibition is intended to address issues such as false detection and security. As will be apparent from the remainder of the description, there are a number of ways to inhibit detection of the non-reflected light, such as including one or more of the following:

- selecting a wavelength channel based on a predetermined or randomised sequence of wavelength channels;
- de-correlating the received light from the outgoing light and incoherently mixing the de-correlated light with a sample of the outgoing light;
- performing optical self-heterodyne of the received light with a sample of the outgoing light at a specific time window;
- imposing a time-varying intensity modulation profile having a specific frequency on the outgoing light;
- imposing a time-varying frequency deviation or intensity profile having a specific frequency chirp characteristic (e.g. a specific chirp rate) on the outgoing light; and
- imposing a code modulation having a specific coding sequence on to the outgoing light.

Figure 1C:
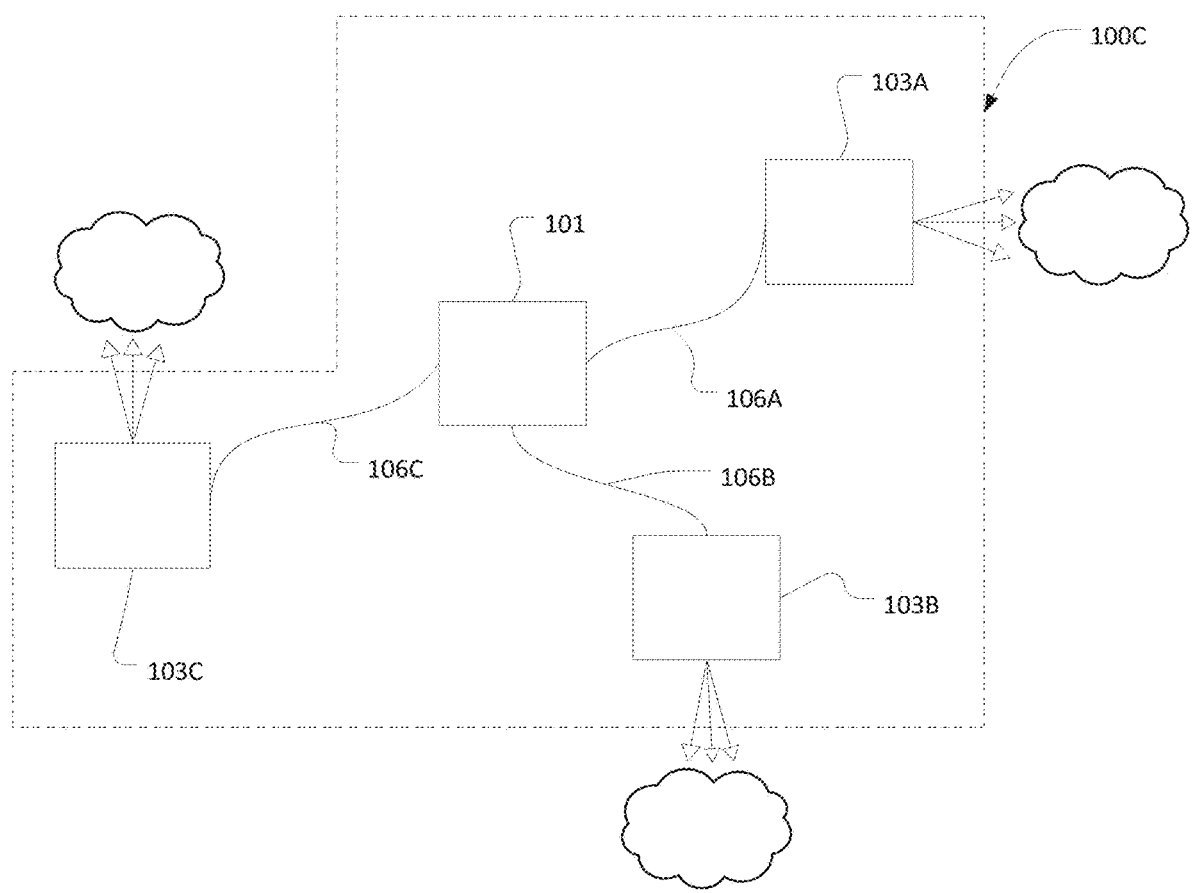

In one example, the light source 102, the beam director 103, the light receiver 104 and the processing unit 105 are substantially collocated. For instance, in an autonomous vehicle application, the collocation allows these components to be compactly packaged within the confines of the vehicle or in a single housing. In another example, in a spatial profiling system 100B as illustrated FIG. 1B, the light source 102, the light receiver 104 and the processing unit 105 are substantially collocated within a "central" unit 101, whereas the beam director 103 is remote from the central unit 101. In this example, the central unit 101 is optically coupled to the remote beam director 103 via one or more optical fibres 106. This example allows the remote beam director 103, which may include only passive components (such as passive cross-dispersive optics), to be placed in more harsh environment, because it is less susceptible to external impairments such as heat, moisture, corrosion or physical damage. In yet another example, as illustrated in FIG. 1C, a spatial profiling system 100C may include a single central unit 101 and multiple beam directors (such as 130A. 130B and 130C). Each of the multiple beam directors may be optically coupled to the central unit 101 via respective optical fibres (such as 106A, 106B and 106C). In the example of FIG. 1C, the multiple beam directors may be placed at different locations and/or orientated with different fields of view.

Light source

A light wave involves an oscillating field E which can mathematically be described as:

$$E(t) \propto \sqrt{I(t)} \cos[\varphi(t)] = \sqrt{I(t)} \cos\left[\frac{2\pi c}{\lambda_k} t + 2\pi f_d(t) t\right]$$

where $I(t)$ represents the intensity of the light, $\varphi(t)=(2\pi c/\lambda_k)t+2\pi f_d(t)t$ represents the phase of the field, $\lambda_k$ represents the centre wavelength of the k-th wavelength channel, $f_d(t)$ represents the optical frequency deviation (hereinafter "frequency deviation" for simplicity) from the centre optical frequency of the k-th wavelength channel, and $c=2.998 \times 10^8$ m/s is the speed of light. The light source 102 is configured to provide the outgoing light having at least one time-varying attribute, such as a time-varying intensity profile I(t) and/or a time-varying frequency deviation $f_d(t)$.

Light having the at least one time-varying attribute may be directed into the environment, back-reflected by a reflecting surface, and collected by the system 100A. As will be described further below, the processing unit 105 may be configured determine the round-trip time, and hence round-trip distance, of the back-reflected light by determining at least one characteristic associated with the at least one time-varying attribute of the back-reflected light.

(a) Time-Varying Intensity Profile I(t)

Figure 2A:
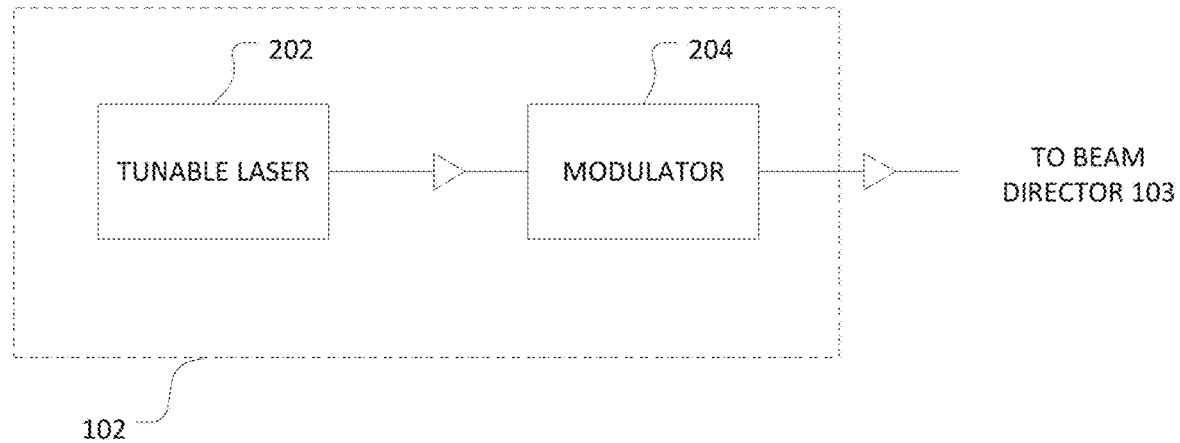
FIGS. 2A and 2B each illustrate an arrangement of a light source providing outgoing light having a time-varying intensity profile.

In one arrangement, the light source 102 is configured to provide the outgoing light having a time-varying intensity profile I(t) at a selected one of multiple wavelength channels (each represented by its respective centre wavelength $\lambda_1$, $\lambda_2$, ... $\lambda_N$). FIG. 2A illustrates an example of one such arrangement of the light source 102. In this example, the light source 102 may include a wavelength-tunable laser 202 of substantially continuous-wave (CW) light intensity, such as a wavelength-tunable laser diode, providing light of a tunable wavelength based on one or more electrical currents (e.g. the injection current into the into one of more wavelength tuning elements in the laser cavity) applied to the laser diode. In another example, the light source 102 may include a broadband light source and a tunable spectral filter to provide substantially continuous-wave (CW) light intensity at the selected wavelength.

Figure 2B:
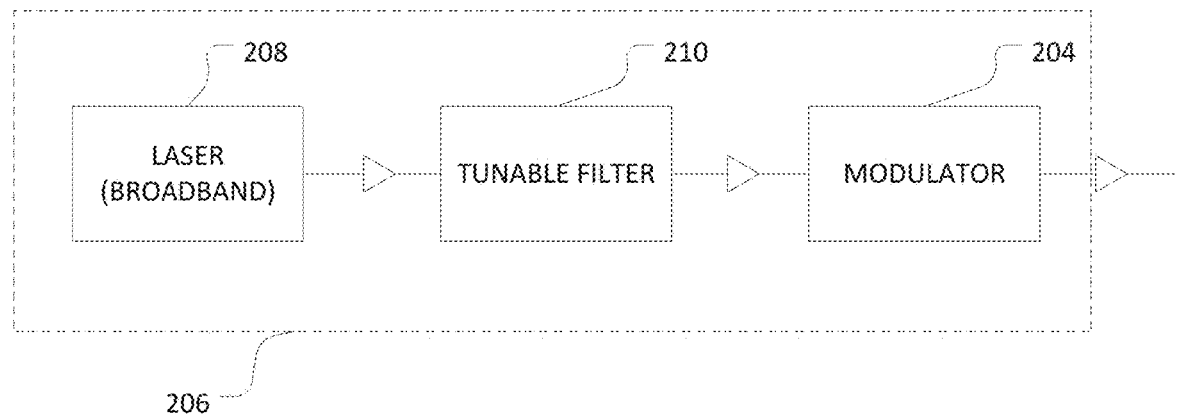

In the example of FIG. 2A, the light source 102 may include a modulator 204 for imparting a time-varying intensity profile on the outgoing light. In one example, the modulator 204 is a semiconductor optical amplifier (SOA) integrated on the laser diode. The electrical current applied to the SOA may be varied over time to vary the amplification of the CW light produced by the laser over time, which in turn provide outgoing light with a time-varying intensity profile. In another example, the modulator 204 is an external modulator (such as a Mach Zehnder modulator or an external SOA modulator) to the laser diode. In another arrangement, as illustrated in FIG. 2B, instead of having a wavelength-tunable laser 202, the light source 206 includes a broadband laser 208 followed by a wavelength-tunable filter 210.

(b) Time-Varying Frequency Deviation $f_d$ (t)

Figure 2C:
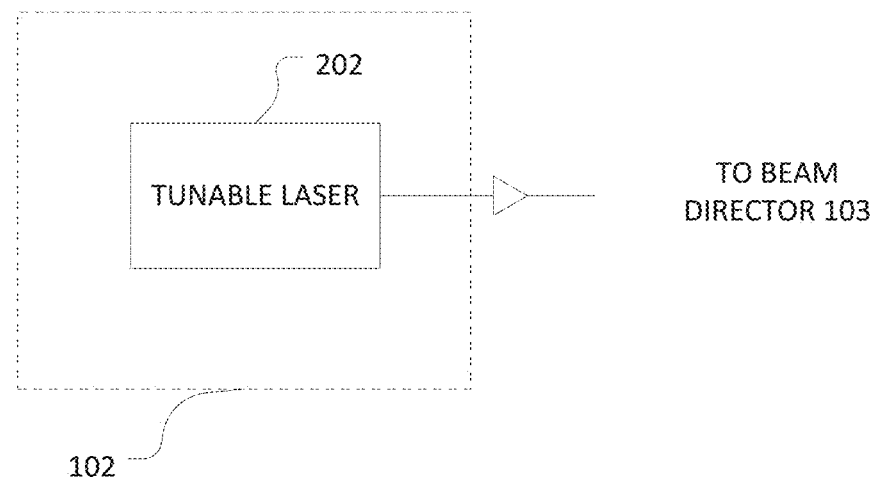
FIGS. 2C and 2D each illustrate an arrangement of a light source providing outgoing light having a time-varying frequency deviation.
Figure 2D:
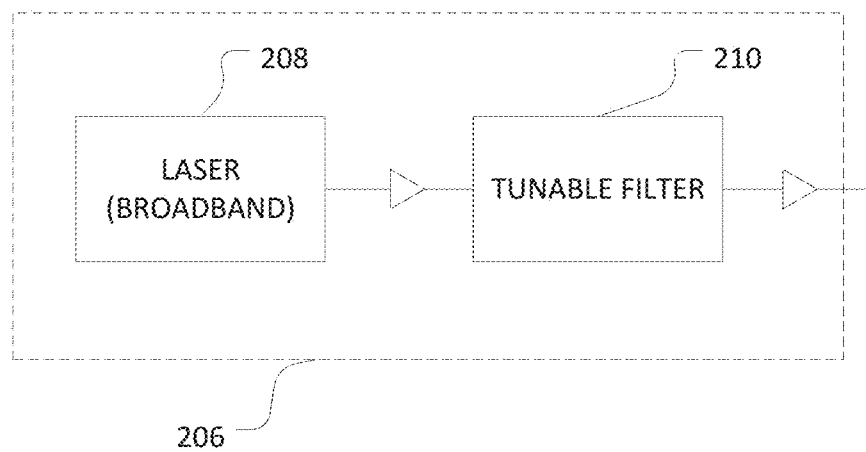

In another arrangement, the light source 102 is configured to provide the outgoing light having a time-varying frequency deviation $f_d(t)$ at a selected one of multiple wavelength channels ($\lambda_1$, $\lambda_2$, ... $\lambda_N$). FIG. 2C illustrates an example of one such arrangement of the light source 102.

The instantaneous optical frequency f and the instantaneous wavelength $\lambda$ of a light field represent an equivalent physical attribute of a wave—the oscillation rate of the light field—and are related by the wave equation $c=f\lambda$. Since the speed of light c is a constant, varying either for $\lambda$ necessarily varies the other quantity accordingly. Similarly, varying either $\lambda_k$ or $f_d$ may be described as varying the other quantity accordingly. In particular, $f_d(t)$ and $\lambda_k$ are related as follows:

$\lambda=c/(c/\lambda_k+f_d)$ and $f=c/\lambda_k+f_d$

In practice, changes in $f_d$ (t) and $\lambda_k$ of the light source 102 may be effected by a single control, e.g. tuning the wavelength of the light source 102 by, for example, an injection current into a laser diode. However, for clarity, the description hereinafter associates frequency deviation $f_d(t)$ with deviation in the optical frequency within a single wavelength channel from its centre optical frequency, whereas changes in $\lambda_k$ are associated with causing the light source 102 to jump from one wavelength channel to another. For example, a smaller and substantially continuous wavelength change of the light source 102 is described to cause a time-varying frequency deviation $f_d(t)$, whereas a larger and stepped wavelength change of the light source 102 is described to cause the light source 102 to jump from wavelength channel $\lambda_k$ to $\lambda_{k+1}$.

In the example of FIG. 2C, the light source 102 may include a wavelength-tunable laser 202 of substantially continuous-wave (CW) light intensity, such as a wavelength-tunable laser diode, providing light of a tunable wavelength based on one or more electrical currents (e.g. the injection current into the into one or more wavelength tuning elements in the laser cavity) applied to the laser diode. In another example, the light source 102 may include a broadband light source and a wavelength-tunable spectral filter to provide substantially continuous-wave (CW) light intensity at the selected wavelength.

(c) Time-Varying Intensity Profile I(t) and Frequency Deviation $f_d$ (t)

In another arrangement, the light source 102 may be configured to provide outgoing light with both time-varying intensity profile I(t) and time-varying frequency deviation $f_d(t)$. The examples shown in FIGS. 2A and 2B are both suitable for use in such an arrangement of the light source 102. The description above on (a) time-varying intensity profile I(t) and (b) time-varying frequency deviation $f_d(t)$ applies to such an arrangement of the light source 102.

The operation of the light source 102, such as both the wavelength-tunable laser 202 (e.g. its wavelength) and the modulator 204 (e.g. the modulating waveform), may be controlled by the processing unit 105, which is described further below.

Beam Director

The beam director 103 is configured to spatially direct the outgoing light into one of multiple directions (301-1, 301-2, ... 301-N) in two dimensions into the environment 110. The direction into which the outgoing light is directed corresponds to, or is based on, the selected one of the multiple wavelength channels (centred at $\lambda_1$, $\lambda_2$, ... $\lambda_N$). For arrangements where the outgoing light has a time-varying frequency deviation $f_d(t)$ within a selected wavelength channel, the selected wavelength channel may encompass a set of closely spaced wavelengths resulting from the time-varying frequency deviation $f_d(t)$ within that wavelength channel. For simplicity, in such arrangements, although the exact wavelength varies slightly over time, the description below uses the notation $\lambda_k$ (i.e. $\lambda_1$, $\lambda_2$, ... $\lambda_N$) to, unless otherwise stated, represent the wavelength channel and, collectively, the set of closely spaced wavelengths.

Figure 3A:
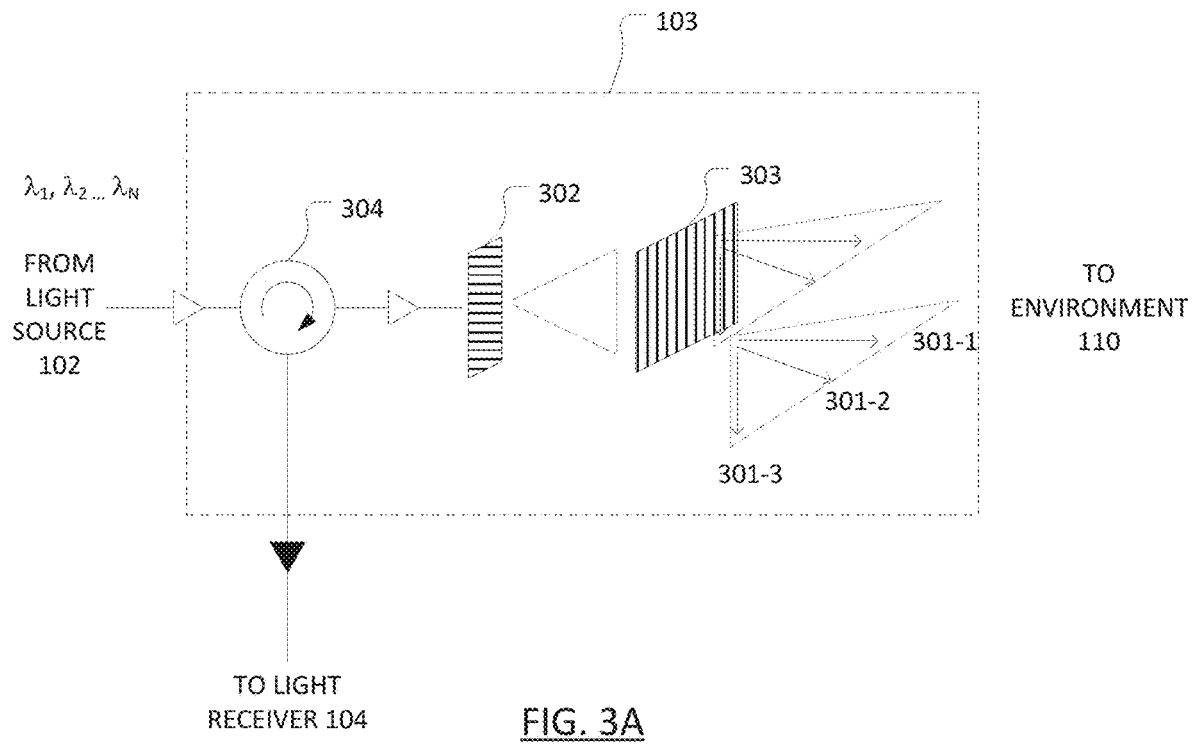
FIG. 3A illustrates an arrangement of a beam director of the spatial profiling system.

FIG. 3A illustrates an arrangement of the beam director 103, which includes spatially cross-dispersive optics, such as passive (i.e. non-moving) spatially cross-dispersive optics. In this arrangement, the passive spatially cross-dispersive optics includes a combination of two spatially dispersive elements optically coupled or arranged in an orthogonal manner. For example, a first spatially dispersive element 302 may be an echelle grating, a virtually imaged phased array (VIPA), and a second spatially dispersive element 303 may be a grating, or prism or grism. The first spatially dispersive element 302 is oriented with the second spatially dispersive element 303 such that light from the light source 102 is steered across a first spatial dimension (e.g. along the horizontal direction or X axis) by the first spatially dispersive element 302 and across a second, orthogonal, spatial dimension (e.g. along the vertical direction or Y axis) by the second spatially dispersive element 303. This arrangement results in a two-dimensional beam steering by folding a one-dimensional beam steering into different diffraction orders to cover the second spatial dimension. An advantage of using passive cross-dispersing optics is that they allow an all-solid-state system with no moving parts and hence a tendency of lower failures, leading to the possibility to miniaturize the system potentially achieving high reliability, high durability, low power consumption and making it suitable for large-scale manufacturing. In another arrangement, the first spatially dispersive element 303 and/or second spatially dispersive element 303 may be replaced by a optical waveguide, such as a 3D optical waveguide, or a photonic crystal structure, such as a 3D photonic crystal. In yet another arrangement, both spatially dispersive elements 302 and 303 may be replaced by a photonic crystal structure.

Although not shown, an alternative arrangement of the combination of light source and beam director is an array of wavelength-tunable light emitters, each associated with a corresponding spatially dispersive element. The light emitter array is configured to emit and spread light along one dimension (e.g. along the horizontal direction to the X-axis), whereas each spatially dispersive element is configured to disperse light from the corresponding light emitter along a substantially perpendicular dimension (e.g. along the vertical direction to the Y-axis), resulting in light being directed in two dimensions into the environment. In one configuration, the wavelength-tunable light emitters are an array of individually wavelength-tunable lasers. In another configuration, the wavelength-tunable light emitters are a single laser coupled to an array of SOAs. If multiple SOAs are used, the multiple SOAs may be separately coded (see description on code modulation further below) for identifying light emitted from a particular SOA in the array. The spatially dispersive element may be a grating, for example.

As mentioned above, in some arrangements, the outgoing light has a time-varying frequency deviation $f_d(t)$, where the instantaneous optical frequency deviates from the centre optical frequency of the k-th wavelength channel. In these arrangements, the instantaneous wavelength at each selected wavelength channel is also varied slightly. As will be explained further below in relation to FIG. 3B, such a time-varying frequency deviation manifests as a small movement in the direction of the outgoing light.

In the above arrangements, the beam director 103 includes reversible optics for spatially directing an outgoing collinear beam from the light source 102 into the multiple directions. Further, the reversible optics spatially directs any reflected light in reversed directions into an incoming collinear beam. The first and second spatially dispersive elements 302 and 303 may act as such reversible optics. The incoming collinear beam means that optics required for the light receiver 104 is simplified since reflected light shares at least part of the optical path taken by the outgoing light within the beam director 103. Furthermore, the reversible optics enhances security of the system by suppressing any spoofed light signal from a direction that does not align with the direction of the outgoing light. Still furthermore, the reversible optics suppresses collection of light reflected via multiple paths or trajectories, where any reflected light collected in non-reversed directions of the outgoing light would otherwise result in an incorrect distance measurement.

In an alternative arrangement, the beam director 103 includes collimating optics (not shown) to collect reflected light. The collimating optics may be separate from the reversible and non-reversible optics, such that any light collected by the collimating optics may be routed to the light receiver 104 along a path not shared by path taken by the outgoing light within the beam director 103. In one example, the collimating optics includes a large aperture lens, an angle magnifier or a fish eye lens for a widened field of view, or alternatively non imaging optics like compound parabolic concentrators.

In the arrangement of FIG. 3A, the beam director 103 also includes non-reversible optics. In one example, the non-reversible optics includes an optical circulator 304. The circulator 304 routes outgoing light to be passed from the light source 102 to the environment 110 via the beam director 103, and routes any light reflected back from the environment 110 collected into the beam director 103 to be passed to the light receiver 104. In an alternative example (not shown), the non-reversible optics includes a beam splitter instead of an optical circulator. In yet another alternative example (not shown), the non-reversible optics includes an optical coupler, such as a 2×1 or 2×2 fibre-optic coupler, for coupling light provided by the light source 102 from one port in a forward direction as outgoing light, and for coupling reflected light collected by the beam director 103 to another port into a backward direction.

Although the description herein is focussed on a directing light in two dimensions into the environment, there may be scenarios where light is directed in only one dimension into the environment. Beam direction in one dimension relaxes the power requirements as well as the field of view requirements compared to a two-dimensional case. A skilled person would appreciate that the description herein on the beam director is still applicable to such scenarios with minor modifications. For example, as a modification to the beam director 103, the second spatially dispersive element 303 may be omitted, with the first spatially dispersive element 302 remaining to direct light into the one dimension only based on the wavelength of the light source 104. In this example, the spatially dispersive element 302 may be a compound prism, or grating or grism. The reflected light may be collected via reversible optics or collimating optics. Where collimating optics are used, the collimating optics may include a compound prism for collimating the spatially dispersed light into collimated light for providing to the light receiver 104.

Light Receiver

The light receiver 104 is configured to receive at least part of the outgoing light reflected by the environment. The light receiver 104 includes an optical-to-electrical conversion unit to convert an optical signal into an electrical signal. In one arrangement, the optical-to-electrical conversion unit includes a photodetector, which produces a photocurrent whose magnitude varies over time based on the time-variation of the intensity of a received optical signal. In another arrangement, the optical-to-electrical conversion unit includes an optical signal processing unit, such as an optical self-heterodyne detector, which nonlinearly mixes any received light with a locally oscillated signal (i.e. local light from the light source 102) to produce an electrical signal that is responsive to difference in optical frequency (or, equivalently, wavelength) between the local light and the received light. The resulting electrical signal has improved signal-to-noise ratio for a received wavelength at or close to the local wavelength while suppressing electrical signals caused by wavelengths far from the local wavelength due to the inherently limited electronic bandwidth of the detector. Since the reflected light need not be coherent, speckles are reduced. In one example, the optical self-heterodyne detector may be a photodiode, which is a photodetector that provides the required non-linear mixing of the locally oscillator signal and the received light.

In an example implementing optical self-heterodyne detection, the received light and the locally oscillated signal may be de-correlated by a differential optical path length to the optical self-heterodyne detector, such that the optical self-heterodyne detection is sufficiently incoherent for controllably reducing any speckles. The differential path length required for substantially speckle-free operation depends on coherence length of the light source 102. In the case where the light source 102 is a semiconductor laser, which has a relatively short coherence length, approximately 30 metres of optical fibre is expected to be required. In comparison, where the light source 102 is a narrow-linewidth laser, which has a relatively long coherence length, approximately 1 kilometre of optical fibre is expected to be required.

In either arrangement, the resulting electrical signal may be processed by the processing unit 105 for determining the round-trip distance travelled by of the reflected light. Depending on the attribute(s) of the outgoing light being varied over time, a different characteristic(s) associated with the time-varying attribute(s) is (are) detected to determine at least the round-trip distance, as further described below.

The required response time of the photodetector depends on the time scale of intensity variation imparted on the outgoing light. It is envisaged that the present technique requires a modulation bandwidth of 100 MHz or less, hence requiring a photodetector having a bandwidth of approximately 60-80 MHz (or a response time in the order of 15-20 ns).

Processing Unit

As mentioned above, the processing unit 105 is operatively coupled to the light source 102 for controlling its operations and, also operatively coupled to the light receiver 104 for determining the round-trip distance travelled by the reflected light and hence the distance of the object. In the arrangement of FIG. 2A or 2C, the processing unit 105 controls the tunable wavelength of the light source 102 by, for example, controlling the one or more currents (e.g. the injection current into the gain medium, or temperature-controlling current into the heatsink) applied to the laser diode. This wavelength control allows control over both the wavelength channel $\lambda_k$ for directing the outgoing light by the beam director 103 based on wavelength, as well as any time-varying frequency deviation $f_d$ (t) within a wavelength channel.

Further, the processing unit 105 controls the time-varying intensity profile by, for example, controlling the current applied to the modulator 204 (which as mentioned can be an SOA or a Mach-Zehnder external modulator). The time-varying intensity profile can take one or more of several forms, each requiring a corresponding detection method for determining the distance of the object. The processing unit 105 may include a processor-readable medium including instructions for the described functions. The processing unit 105 may be implemented as any one or more of a microprocessor, a field-programmable gate array (FPGA) and an application-specific integrated circuit (ASIC).

Wavelength Control

Figure 3B:
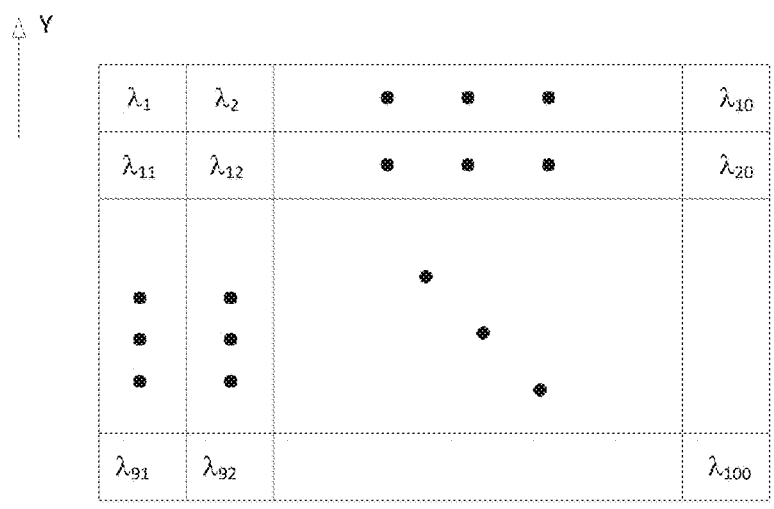
FIG. 3B illustrates schematically an association between pixels of a field of view and wavelength channels of emitted light of the light source.

Controlling the wavelength channel $\lambda_k$ of light from the light source 102 effectively controls the direction (in two dimensions) in which the beam director 103 directs the light to the environment 110. Each wavelength channel represents a pixel or a point within a field of view, as schematically shown in FIG. 3B, which illustrates 100 pixels or points represented in a Cartesian-based coordinate system, with 10 pixels across each of X and Y directions. In the arrangement where the beam director 103 includes two spatially dispersive elements, the first and second spatially dispersive elements may be configured to spatially disperse light in the X and Y directions, respectively, based on the wavelength channel. To generate a spatial profile, each wavelength (and hence each direction, pixel or point) may be associated with a distance from a reflecting surface in that direction, pixel or point. Additionally, controlling the wavelength of light within a wavelength channel provides the outgoing light a time-varying frequency deviation $f_d$(t). As mentioned, changes wavelength channel $\lambda_k$ are associated with larger and stepped changes in wavelength (or optical frequency), whereas the time-varying frequency deviation $f_d$(t) is associated with smaller and substantially continuous changes in wavelength (or optical frequency).

If the light source 102 is a telecommunication-grade laser, it may have a wavelength tuning range of up to 40 nm, for example from approximately 1527 nm to approximately 1567 nm, and an optical frequency tuning resolution of approximately 10 MHz (which at 1550 nm corresponds to a wavelength tuning resolution of approximately 0.0001 nm). As an illustrative example, consider that two neighbouring wavelength channels whose centre wavelengths $\lambda_k$ and $X_{k+1}$ are 1550.00 nm and 1550.10 nm, respectively, corresponding to centre optical frequencies of 193.419355 THz and 193.406877 THz, respectively. The two wavelength channels may be associated with two neighbouring pixels in FIG. 3B. In this example, the two wavelength channels have an optical frequency difference of 12.478 GHz. In contrast, the frequency deviation of the light source 102 may be caused to vary over time within the same wavelength channel within a range of approximately +/−0.5 GHz. In other words, in this example, while more than 10 GHz of optical frequency change is required to direct the outgoing light beam from one pixel to the next (i.e. the width of one pixel), a maximum frequency deviation of approximately +/−0.5 GHz causes the outgoing light beam to move less than +/−5% of the pixel width. This slight movement of the light beam due to the time-varying frequency deviation $f_d$(t) may manifest as a noise-averaging or smoothing effect on the spatial profile measurement.

In the example of FIG. 1C, where the system 100C includes multiple beam directors, each beam directors may be configured to be responsive to a different range of wavelength channels. For example, light of wavelength channels centred at $\lambda_1, \lambda_2, \ldots \lambda_N$ routed to beam director 103A may be directed to its related environment and back reflected to reach light receiver 104, whereas light of the same wavelength channels routed to beam directors 103B and 103C may be directed not to their respective environments (e.g. instead to a light absorber) to suppress any reflected light reaching light receiver 104.

Timing Control

Figure 4A:
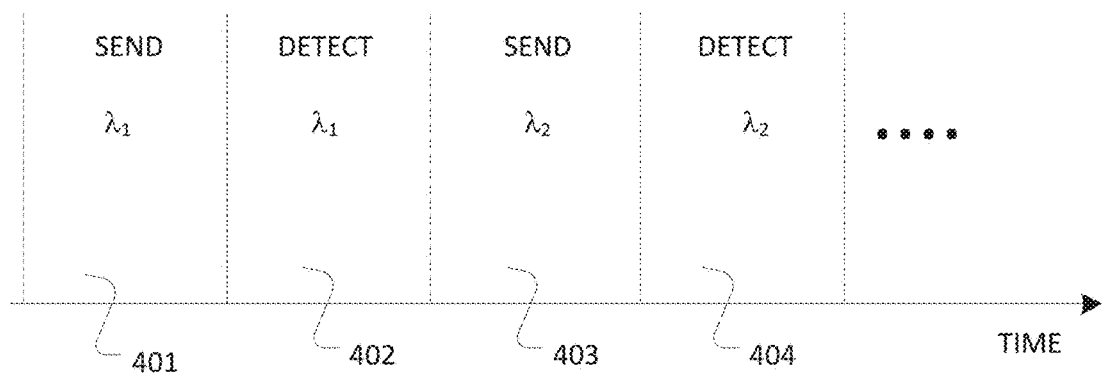
FIG. 4A illustrates an arrangement of timing control of light transmission windows and the light receiving windows.

The processing unit 105 controls the respective timing of light transmission windows (such as 401 and 403) and the light receiving windows (such as 402 and 404). FIG. 4A illustrates one such arrangement of timing control from the perspective of the system as a whole (see below for the perspectives of the light source 102, the beam director 103 and the light receiver 104). In this arrangement, light of different wavelength channels is provided in a sequential manner. The processing unit 105 generally alternates between light transmission windows of different wavelength channels $\lambda_1, \lambda_2, \ldots \lambda_N$ with light receiving windows of respective wavelength channels $\lambda_1, \lambda_2, \ldots \lambda_N$. In another arrangement, there may be an overlap between neighbouring transmission and receiving windows. For example, the transmission and receiving windows for a particular wavelength channel may start and end at the same time. As another example, the transmission and receiving windows for a particular wavelength channel may start at the same time, but the transmission windows ends earlier than the receiving window ends. In yet another arrangement, there may be no overlap between neighbouring transmission and receiving windows.

During the light transmission window 401, the processing unit 105 causes the light source 102 to produce light at a first wavelength channel $\lambda_1$). For example, the processing unit 105 may cause a specific current corresponding to wavelength $\lambda_1$ to be applied to the laser diode.

During the light receiving window 402, light from the light source 102 may cease to be produced. Alternatively, the light source 102 continues to produce light redirected to the light receiver 104 via the direct path for the optical switch. Still alternatively, in the example with a sampler following the light source 102, where a portion of the outgoing light is provided to the light receiver 104, the light source 102 continues to produce light but re-direction is necessary. The processing unit 105 detects any electrical signal corresponding to any light received by the light receiver 104. If optical self-heterodyne detection with the local oscillating signal from the light transmission window 401 is used, then received light at wavelengths other than those of the first wavelength channel $\lambda_1$ will likely be suppressed due to the inherently limited detector bandwidth. Such suppression enhances the security of the system by minimising the impact of spoofing by, e.g. optical flooding. The use of optical self-heterodyne also has a benefit that, if the light source 102 is a semiconductor laser, any undesired side modes of the semiconductor laser are also filtered out. During the light receiving window 402, light at the first wavelength channel $\lambda_1$ from the light source 102 may be either ceased to be provided or redirected, e.g. via an optical fibre, to the light receiver 104 for mixing in optical self-heterodyne detection. The description on the light transmission window 401 and the light receiving window 402 is similarly applicable to the light transmission window 403 and the light receiving window 404, respectively, with a change of wavelength channel $\lambda_1$ to wavelength channel $\lambda_2$. The windows (such as 401, 402, 403 and 404) may be of the same or different duration.

To facilitate one arrangement of timing control by the processing unit 105, the light source 102, the beam director 103 and the light receiver 104 may function as follows in an illustrative example. In this example, a sampled portion of the light from the light source 102 is provided to the light receiver for optical self-heterodyne detection, and the light source 102 does not cease to produce light during a receiving window:

The processing unit 105 controls the light source 102 to produce a sequence of light transmission windows each associated with a different wavelength channel (e.g. $\lambda_1, \lambda_2 \ldots \lambda_N$). The light source 102 produces light continuously or substantially continuously, as it is tuned to another wavelength channel without being switched off.

The beam director 103 is provided with light at wavelength channel $\lambda_1$ and directs it into direction 1. While light at wavelength channel $\lambda_1$ is still being directed into direction 1, reflected light at wavelength channel $\lambda_1$ may be collected by the beam director 103. As the processing unit 105 controls the light source 102 to change to wavelength channel $\lambda_2$, the beam director 103 is provided with light at $\lambda_2$ and directs it into direction 2. While light at wavelength channel $\lambda_2$ is still being directed into direction 2, reflected light at wavelength channel $\lambda_2$ may be collected by the beam director 103, and so on for subsequent wavelength channels.

The light receiver 104 receives a sample portion of the outgoing light from the light source 102 while the light source 102 emits light. For example, while the light receiver 104 is provided with sampled outgoing light at wavelength channel $\lambda_1$, the light receiver may also receive reflected light at wavelength channel $\lambda_1$ which mixes with the sampled outgoing light at wavelength channel $\lambda_1$ for optical self heterodyne detection. As the processing unit 105 controls the light source 102 to change to wavelength channel $\lambda_2$, the light receiver 104 is provided with sampled outgoing light at $\lambda_2$, while still potentially receiving light at wavelength channel $\lambda_1$. While the light receiver 104 is being provided with sampled outgoing light at wavelength channel $\lambda_2$, the light receiver may also receive reflected light at wavelength channel $\lambda_2$ which mixes with the sampled outgoing light at wavelength channel $\lambda_2$ for optical self heterodyne detection, and so on for subsequent wavelengths.

At the times where the light receiver 104 is subject to sampled outgoing light and reflected light at mismatched wavelength channels, the resulting electrical signal is expected to have a sufficiently high beat frequency which can be filtered out via electronic or digital signal processing. Further, for mismatch where the beat frequency is higher than the bandwidth of the optical processing unit (e.g. the photodiode), no dedicated filtering is required due to the limited frequency response of the optical processing unit.

Other arrangement of timing controls may also be possible. For example, light from the light source 102 may be re-directed via a direct path, other than sampled, to the light receiver 104.

The processing unit 105 may be configured to control the sequential manner in a predetermined sequence, such as in a wavelength-increasing or wavelength-decreasing order, effectively performing a 2D raster scan of the field of view. To enhance security, the predetermined sequence may hop across different wavelength channels in a manner only known to the system (e.g. $\lambda_1, \lambda_{100}, \lambda_{35}, \lambda_{150}, \ldots$).

The predetermined sequence may also be adjusted by the processing unit 105, for example, if it is desired to look at a selected portion of the field of view. Referring to FIG. 3B, the system may be a normal "scan" mode, in which the processing unit 105 is configured that the predetermined sequence is $\lambda_1, \lambda_2 \ldots \lambda_{100}$ covering a particular field of view. If the processing unit 105 determines that most of the 100 pixels are associated with a distance of around 300 metres (e.g, indicating a wall at 300 metres away), except that 4 neighbouring pixels at $\lambda_{12}, \lambda_{13}, \lambda_{22}, \lambda_{23}$ are associated with a distance of around 50 metres, then the processing unit 105 may determine that there is an object around 50 metres away in the direction of the 4 neighbouring pixels.

After determining that there is an object around 50 metres away in the direction of the 4 neighbouring pixels, in one arrangement, the system may enter a "stare" mode, in which the processing unit 105 may be configured to adjust the predetermined sequence to $\lambda_{12}$, $\lambda_{13}$, $\lambda_{22}$, and $\lambda_{23}$ (i.e. 2×2 pixels) only, covering the direction of the 4 neighbouring pixels only to determine any changes in distance of that object over time. Any changes in distance would indicate movement close to or away from the system. In another arrangement, the system may enter a "track" mode, in which the processing unit 105 may be configured to determine the distance associated with the 4 neighbouring pixels as well as surrounding pixels to anticipate any movement of the object outside the stared field of view. For example, the processing unit 105 may be configured to adjust the predetermined sequence to $\lambda_1$, $\lambda_2$, $\lambda_3$, $\lambda_4$, $\lambda_{11}$, $\lambda_{12}$, $\lambda_{13}$, $\lambda_{14}$, $\lambda_{21}$, $\lambda_{22}$, $\lambda_{23}$, $\lambda_{24}$, $\lambda_{31}$, $\lambda_{32}$, $\lambda_{33}$, and $\lambda_{34}$ (i.e. 4×4 pixels).

The processing unit 105 may also be configured to adjust the frame rate by controlling how quickly the light source 102 is tuned from one wavelength channel to the next, and the spatial resolution by tuning to, for example, every second wavelength channel (i.e. $\lambda_1$, $\lambda_3$, $\lambda_5$, $\lambda_7$ . . . ) of all the tunable wavelength channels of the light source 102. The refreshing rate for completing a full scan (i.e. determining a distance associated with all desired wavelengths) depends on the desired number of directions, pixels or points within a field of view, and the duration of the light transmission and receiving windows. The refreshing rate may be different for different applications. For example, in the field of docking, a refreshing rate of 5 Hz may be adequate. In time-critical fields, such as autonomous vehicles, a higher refreshing rate than 5 Hz may adequate.

The processing unit 105 may also be configured to adjust the predetermined sequence to account for optical aberration effects. For example, in the arrangement where the beam director 103 includes collimating optics such as an angle magnifier or a fish-eye lens, the field of view may exhibit barrel distortion, causing the field of view to warp in its outer portion. The processing unit 105 may be configured to cause the light source 102 to deliberately omit emitting at wavelengths corresponding to some of the outer pixels to counter such distortion.

Alternatively the sequential manner includes a randomised sequence. The processing unit 105 may determine the randomised sequence.

In conjunction with optical self-heterodyne detection, the use of a particular sequence (whether predetermined or randomised) means that only reflected light of a specific wavelength channel at a specific light receiving window are adequately detected, suppressing light at other wavelength channels, thereby enhancing the security of the system.

As mentioned above, the present disclosure provides arrangements where the at least one time-varying attribute is either or both of a time-varying intensity profile and a time-varying frequency deviation. Each of these time-varying attributes and the corresponding detection techniques to determine round-trip time, and hence round-trip distance, are described further below.

Time-Varying Intensity Control

Figure 4B:
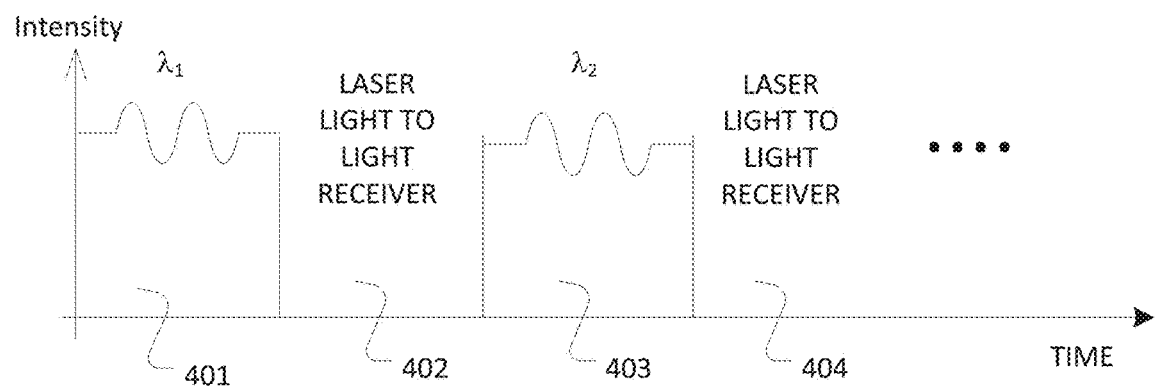
FIG. 4B illustrates an example of the outgoing light intensity over time over the light transmission and receiving windows.

In arrangements involving a time-varying intensity profile, the processing unit 105 may impart a time-varying intensity profile of the outgoing light. For example, the processing unit 105 may cause a modulation or time-varying current to be applied to the modulator 204, which in turns imparts a time-varying intensity profile on the outgoing light from tunable laser 202. FIG. 4B illustrates the intensity over time over the light transmission and receiving windows 401, 402, 403 and 404. The time-varying intensity profile in FIG. 4B is illustrative only. There may be a number of different time-varying intensity profiles imparted on the outgoing light as discussed below:

(i) Periodic Intensity Modulation

Figure 4C:
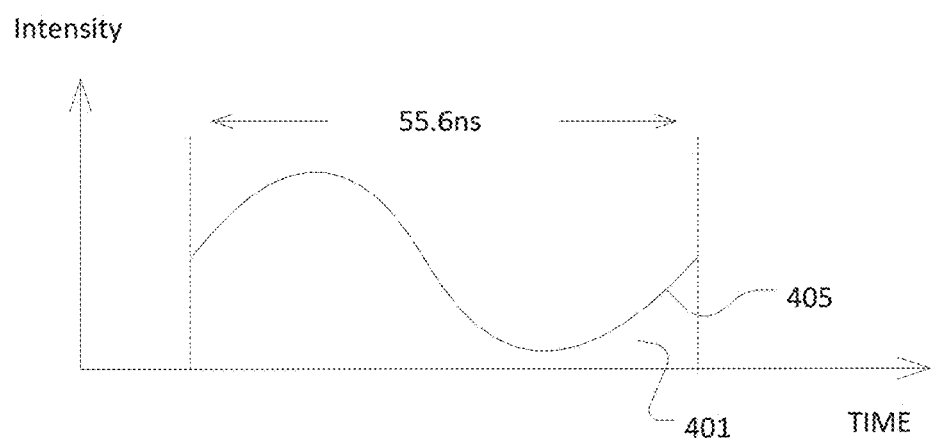
FIGS. 4C and 4D each illustrate an example of periodic modulation.

In one example, within a light transmission window 401, as illustrated in FIG. 4C, the processing unit 105 causes a current having a DC component and a periodic modulation. The periodic modulation may be sinusoidal modulation having a single frequency component. For instance, as illustrated in FIG. 4C, the intensity profile 405 includes a 18-MHz tone of a single cycle, which translates to a period of 55.6 ns and represents a spatial extent of 16.66 m. Any light reflected by an object (i.e. a reflector) and received by the light receiver 104 is expected to include the same or substantially the same tone (ignoring non-ideal effects, such as scattering and absorption) that is phase shifted compared to a local copy of intensity profile. The phase shift is proportional to the time required for the light to make a round trip to and from the object. In this instance, every additional $\pi/2$ or 90° phase shift represents a reflector distance of 16.66 m/8=2.08 m. Once the received light is detected by, e.g. a photodetector as an electrical signal, the phase shift may be determined by the processing unit 105 by an electrical self-heterodyne method due to the availability of a local copy of the periodic modulation applied by the processing unit 105.

In this example, where the intensity profile 405 includes a specific frequency, the processing unit 105 may perform signal processing on the received light to inhibit detection of non-reflected light (e.g. spoofed light). In one arrangement, any received light is detected and converted to a digital signal, which is then match-filtered by a locally generated electrical signal having the same specific frequency. The match filtering is mathematically equivalent to a temporal convolution operation. If the received light is not at the specific frequency, the convolution output is expected to be zero. A zero or low output is itself an inhibition of the detection of any non-reflected light. Alternatively, the processing unit 105 may disallow light detection by the light receiver 104 based on the zero or low output to inhibit the detection of any non-reflected light. In another arrangement, to allow for any Doppler shift due to reflected light off a moving reflecting surface, any received light after conversion to a digital signal is first fast-Fourier-transformed to determine the frequency components present in the received light. By adopting a frequency tolerance set by an expected Doppler shift, the processing unit 105 allows light detection by the light receiver 104 based on presence of any frequency components that is within the tolerance.

Figure 4D:
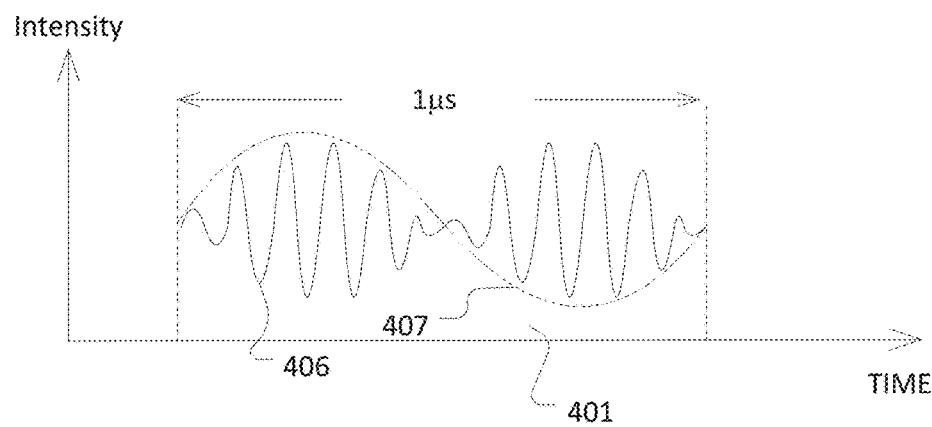

In another instance, the periodic modulation includes multiple frequency components. As illustrated in FIG. 4D, within a light transmission window 401, the intensity profile 406 includes a 18-MHz and 19-MHz dual-tone, resulting in an envelope 407 or beat tone at 1 MHz, which translates to an envelope period of 1 s and represents a spatial extent of 300 m. Any light reflected by an object (i.e. a reflector) and received by the light receiver 104 is expected to include the same or substantially the same beat tone (ignoring non-ideal effects, such as scattering and absorption) that is phase shifted or delayed compared to a local copy of intensity profile. The phase shift or delay of the envelope 407 is proportional to the time required for the light to make a round trip to and from the object. In this instance, every additional $\pi/2$ or 90° phase shift of the envelope represents a reflector distance of 300 m/8=37.5 m. Once the received light is detected by, e.g. a photodetector as an electrical signal, the phase shift may be determined by the processing unit 105 by an electrical or digital self-heterodyne method due to the availability of a local copy of the periodic modulation from the processing unit 105. In addition to determining the phase shift of the envelope, which provides a longer-range measurement of distance, the phase shift of the 18-MHz tone and/or 19-MHz tone may be determined by the processing unit 105 to provide a shorter-range measurement of distance. In other words, the beat tone is used for a coarse measurement of distance, whereas the individual tone(s) is/are used for a fine measurement of distance.

(ii) Code Modulation

Figure 4E:
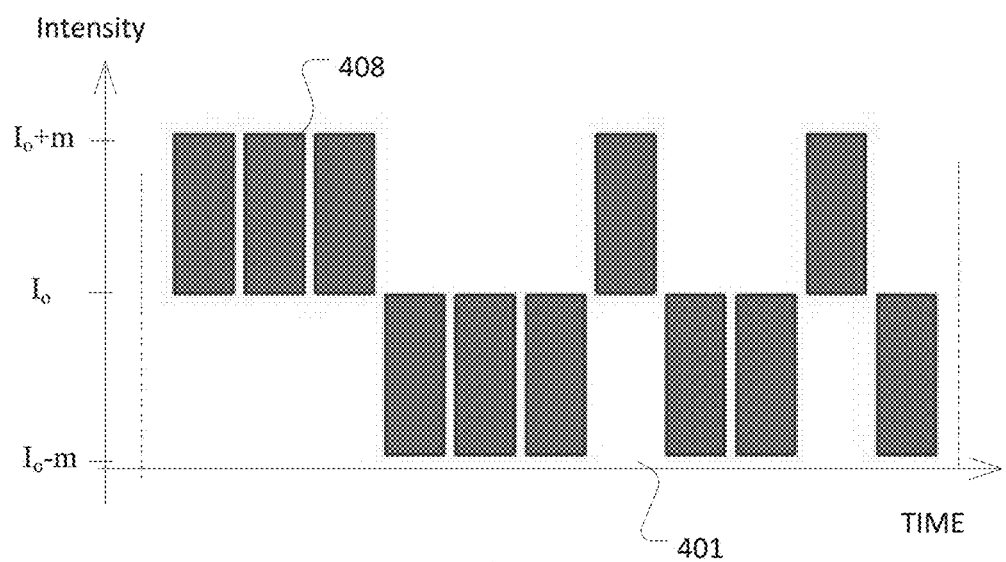
FIGS. 4E and 4F each illustrate an example of code modulation.

In one example, the processing unit 105 causes a current having a DC component and a pattern or code modulation. The code modulation may involve modulating the intensity profile according to one or more coding sequence. FIG. 4E illustrates one such case of the intensity profile 408 of the outgoing light within a light transmission window 401. In this case, the intensity varies over time according to a Barker coding sequence of 11100010010, with a logical 1 represented by an increase (+m) in intensity above the DC component and a logical 0 represented by a decrease (−m) in intensity below the DC component. Any light reflected by an object (i.e. a reflector) and received by the light receiver 104 is expected to include the same or substantially the same coding sequence (ignoring non-ideal effects, such as scattering and absorption) that is delayed compared to a local copy of the intensity profile. The delay is proportional to the time required for the light to make a round trip to and from the object. In this case, once the received light is detected by, e.g. a photodetector as an electrical signal, the processing unit 105 may be configured to perform an autocorrelation of the detected signal with a signal generated with the coding sequence, which is known locally to the processing unit 105. The autocorrelation delay at which a peak autocorrelation signal occurs corresponds to the distance of the object. For instance, for every additional 10 ns of autocorrelation delay required to attain a maximum autocorrelation signal represents an object distance of 1.5 m. An advantage of using code modulation with autocorrelation is that the autocorrelation signal as a function of delay typically includes multiple peaks (i.e. local maxima) at equal delays from either side of the maximum peak (i.e. at delays $-\tau_3$, $-\tau_2$, $-\tau_1$, 0, $+\tau_1$, $+\tau_2$, $+\tau_3$). The multiple peaks allow more accurate determination of the delay at which the maximum peak occurs. Further, the use of code modulation enhances the security of the system. An autocorrelation performed with a sequence that is not the same as the locally known sequence results in a noisy autocorrelation signal.

Figure 4F:
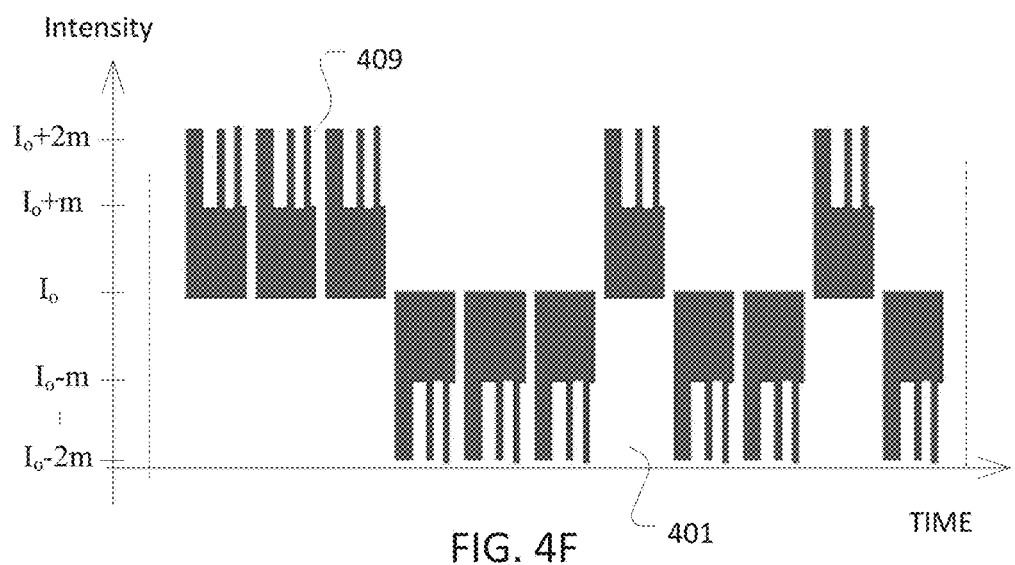

It has been suggested that use of Barker code sequences enhances the accuracy of autocorrelation. However, there are only a limited number of known Barker code sequences, and they are of a limited bit length. To address this limitation, another example relies on a combination of fast-varying Barker code and a slowly-varying Barker code. In particular, as illustrated by FIG. 4F, the processing unit 105 may apply the fast-varying Barker code (with intensity +m and 0 representing logical 1 and 0 respectively) on top of a slowly-varying Barker code (with additional intensity +m and −m representing logical 1 and 0 respectively) to the intensity profile 409 of the outgoing light.

The coding sequence is adjustable for avoidance of interference with another spatial mapping system. In some configurations, the coding sequence may be randomised. The code may be randomised once, for example upon initial start-up of the system or upon factory reset, or may be re-randomised after a certain time has elapsed, for example at regular intervals.

The duration of the transmission and receiving window may also be used to govern the range of the spatial profiling system. If reflected light at wavelength $\lambda_1$ is received outside the light receiving window 402, it may not be able to be detected, since the system is either a light transmission window, in which the processing unit 105 may be configured to ignore any light detected by the light receiver 104, or in a light receiving window of a different wavelength, leading to a suppressed detection of wavelength $\lambda_1$ if optical self-heterodyne detection is used.

(iii) Aperiodic Intensity Modulation

In one example, the time-varying intensity profile of the outgoing light may include aperiodic intensity modulation. In this example, the processing unit 105 may cause a current having a DC component and aperiodic modulation to be applied to the light source 102. The aperiodic modulation may be a chirped sinusoidal modulation. The chirp rate may be predetermined, for example, increasing or decreasing in frequency. In one case, the chirp may range between 10 MHz and 100 MHz. For instance, the time-varying intensity profile can be modulated at 10 MHz at the start of the light transmission window 401, and modulated at 100 MHz at the end of the light transmission window 401, with the intensity modulation gradually increasing from 10 to 100 MHz (or decreasing from 100 MHz to 10 MHz) during the light transmission window 401. The chirp rate may be linear or non-linear.

Alternatively or additionally, the chirp may be changed. For example, the chirp may include intensity modulation starting at 10 MHz and increased towards 100 MHz for a first time period, and then changed to modulation starting at 20 MHz and increased towards 200 MHz for a second time period after the first time period. Further, the change in the chirp may be predetermined or randomised to inhibit detection of unintended reflected light (e.g. spoofed light) to increase security.

Any light so aperiodically modulated and reflected by an object (i.e. a reflector) and received by the light receiver 104 is expected to include the same or substantially the same aperiodic modulation (ignoring non-ideal effects, such as scattering and absorption) that is delayed compared to a local copy of the intensity profile. The delay is proportional to the time required for the light to make a round trip to and from the object. In this case, once the received light is detected by, e.g. a photodetector as an electrical signal, the processing unit 105 may be configured to perform an electrical or digital heterodyne detection due to the availability of a local copy of the aperiodic modulation from the processing unit 105. The output of the electrical or digital heterodyne detection is the difference in modulation frequency between the local and the reflected light due to the chirp. With a predetermined or otherwise known chirp rate r, the processing unit 105 may be configured to determine the delay based on the output of the electrical or digital heterodyne detection.

For instance, if the delay between the local and the reflected light corresponds to half the transmission window 401 lasting for 1 µs, and if the chirp rate is linear from 10 to 100 MHz (i.e. 90 MHz per 1 µs), the electrical or digital heterodyne detection will produce an output including a 45 MHz difference in modulation frequency between the local and reflected light (based on 10 MHz and 55 MHz at the start and the middle of the transmission window 401). The processing unit 105 may determine based on the 45 MHz difference in modulation frequency from the output of the electrical or digital heterodyne detection that the delay equals 45 MHz/90 MHz×1 µs=0.50 µs, corresponding to a distance to the target equal to (c×0.5 μs)/2=74.95 m. For a given chirp rate, a larger difference in modulation frequency represents a larger delay and distance to the target.

Time-Varying Frequency Deviation Control

In arrangements involving a time-varying frequency deviation, the processing unit 105 may impart the outgoing light at one or more wavelength channels each with a respective time-varying frequency deviation $f_d(t)$. In these arrangements, the light receiver 104 includes an optical self-heterodyne detector, which produces an electrical signal responsive to the difference in optical frequency (or wavelength) between the received light and the local light. This electrical signal is referred to as the mixed signal below.

Figure 5A:
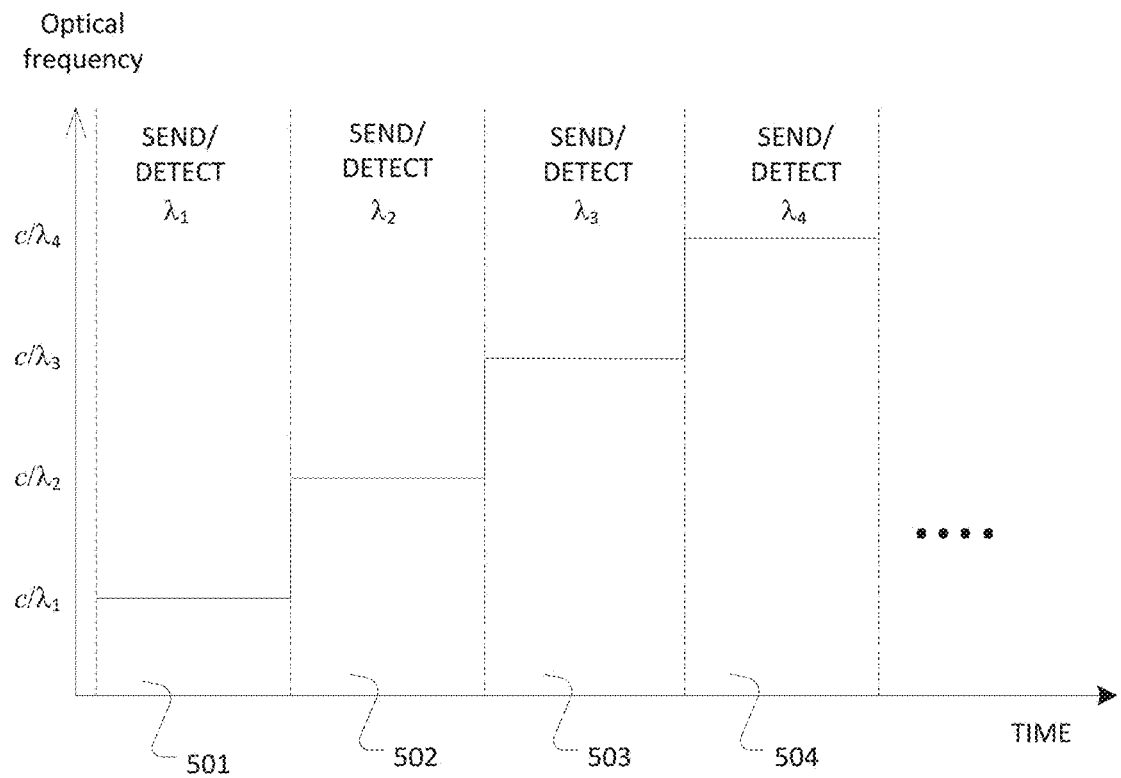
FIGS. 5A and 5B illustrate a comparison between arrangements without and with time-varying frequency deviation control, respectively.
Figure 5B:
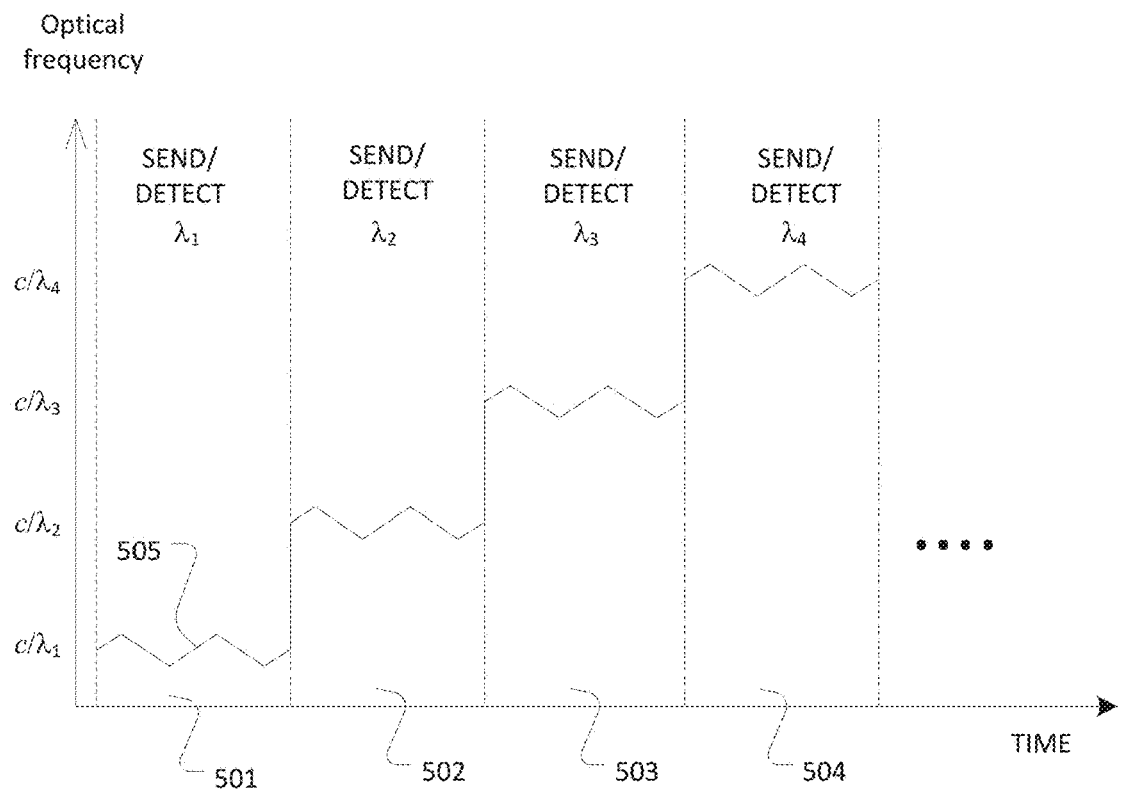

FIGS. 5A and 5B illustrate a comparison between arrangements with and without such a time-varying frequency deviation. FIG. 5A illustrates an example where the light source 102 is caused to change its wavelength channel in the following sequence: $\lambda_1, \lambda_2, \lambda_3,$ and $\lambda_4$ (corresponding to optical frequency $c/\lambda_1, c/\lambda_2, c/\lambda_3,$ and $c/\lambda_4$ where $\lambda_k$ is the centre wavelength of k-th wavelength channel) over time slots 501, 502, 503 and 504 without any time-varying frequency deviation. Each time slots relates to the transmission and detection of light at the respective wavelength channel. In contrast, FIG. 5B illustrates an example where the light source 102 is caused to change its wavelength channel in the same sequence over the time slots, but each with a time-varying frequency deviation 505. In the example represented by FIG. 5B, all wavelength channels are imparted with the same time-varying frequency deviation 505. In other examples, the wavelength channels may be imparted with different time-varying frequency deviations. In yet other examples, some of the wavelength channels may be imparted with no time-varying frequency deviation. In the example represented by FIG. 5B, the wavelength channels are in a consecutive sequence. In other examples, the wavelength channels may be in another predetermined sequence, such as a non-consecutive sequence, or a randomised sequence. Within each time slot, the optical frequency deviates within its respective wavelength channel over time. The frequency deviation may be changed (increased and/or decreased) linearly at a rate R determined or otherwise known by the processing unit 105. The time-varying frequency deviation may be in the form of a triangular waveform (e.g. one or more increasing and decreasing linear ramps, as shown in Figure 5B), or a sawtooth waveform (e.g. one or more increasing linear ramp followed by a sudden decrease of frequency deviation, not shown).

Figure 6A:
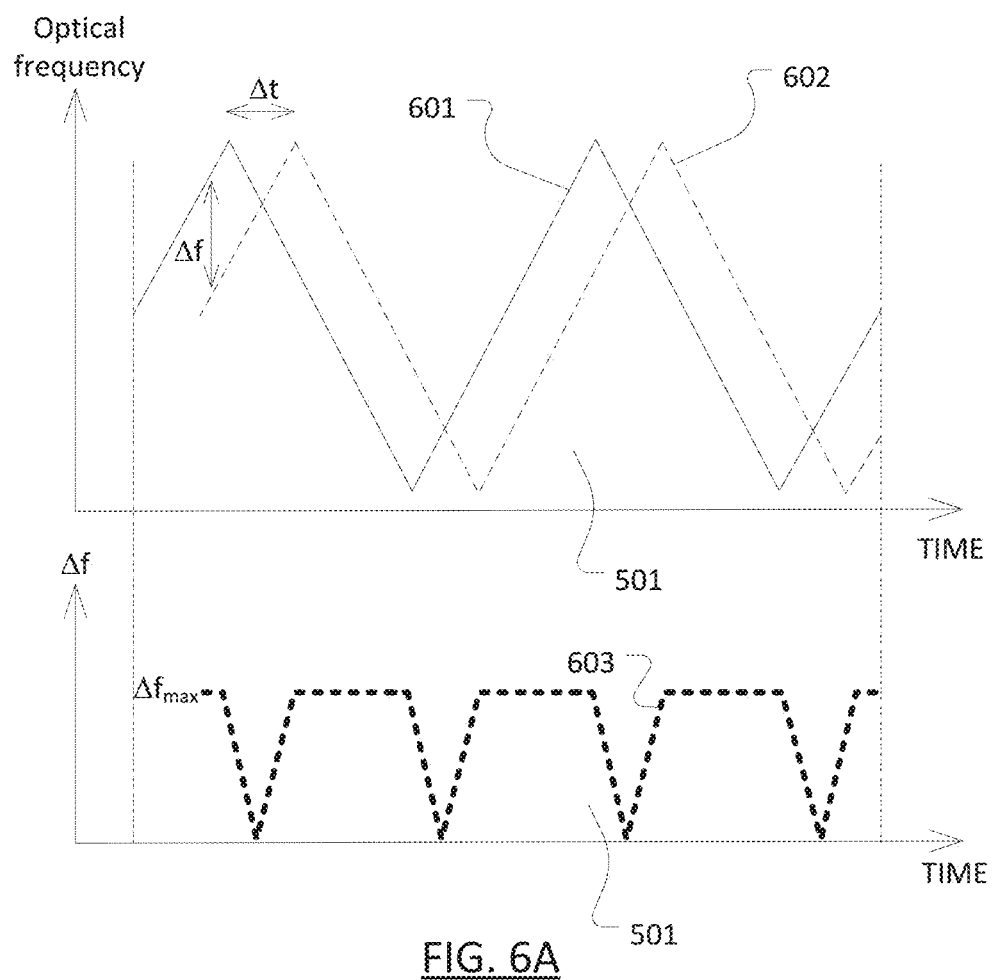
FIG. 6A illustrates the optical frequency of local light, optical frequency of received light and their frequency difference in the case where a target is stationary.
Figure 6B:
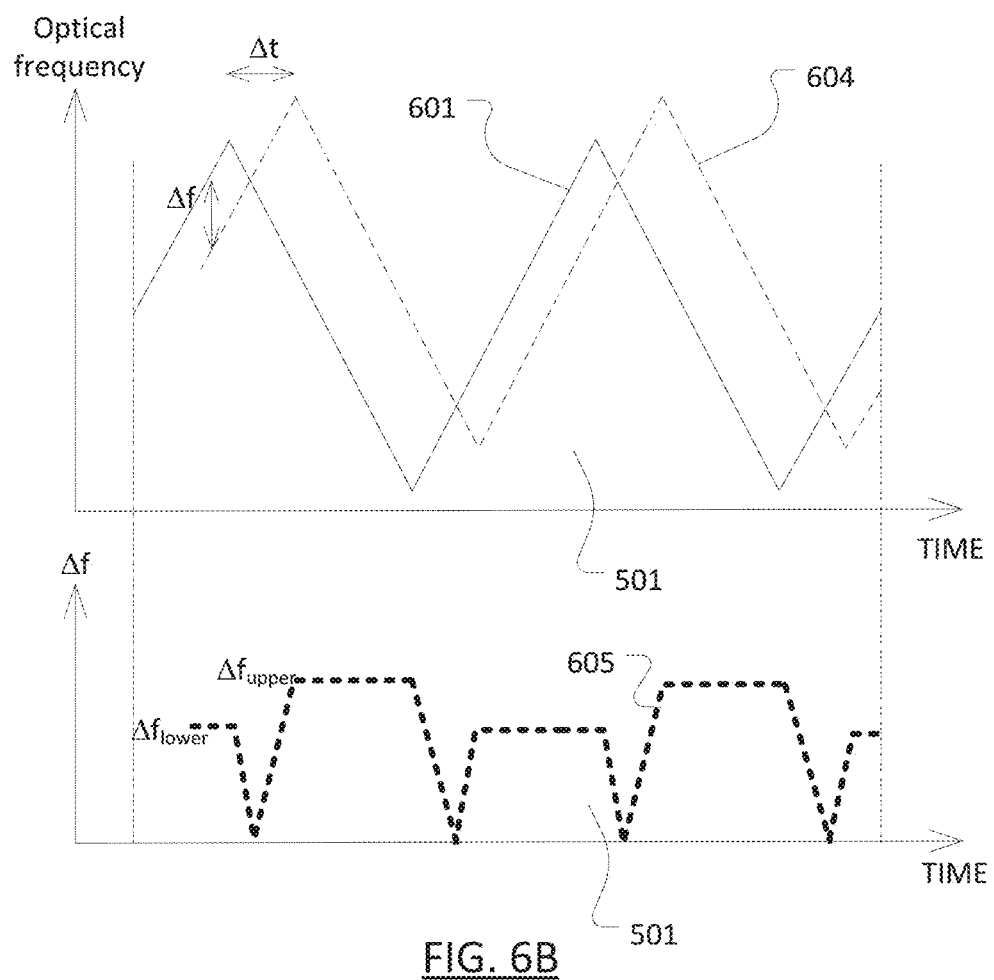
FIG. 6B illustrates the optical frequency of local light, optical frequency of received light and their frequency difference in the case where a target is moving.

The processing unit 105 may be configured to determine the distance of a target based on reflected light having the same or substantially the same time-varying frequency deviation. FIG. 6A illustrates the optical frequency of the local light 601 and the received light 602 (top) and the frequency difference Δf 603 (bottom) over time. Since the frequency deviation is constantly changing, any reflected light 602 will lag behind in frequency deviation from the local light 601 by the round-trip time Δt, as illustrated in FIG. 6A. In case of the frequency deviation varying according to a sawtooth waveform, the frequency difference 603 attains a maximum value $\Delta f_{max}$ in between momentary drops to zero frequency difference varies over time. Moreover, the further round-trip distance the reflected light has to travel, the large the round-trip time Δt is, and the larger the frequency difference Δf between the received light and the local light is. As mentioned above, the optical self-heterodyne detector of the light receiver 104 mixes the received light and the local light and produces an electrical signal oscillating at the frequency difference Δf. The frequency difference Δf is likely in the radio frequency (RF) region. In the example mentioned earlier, where the frequency difference Δf is varied between +/−0.5 GHz, Δf is at most 1.0 GHz. Because the frequency deviation changes linearly in a known rate R, the mixed signal will oscillate at a frequency proportional to the round-trip distance. Accordingly, the processing unit 105 may be configured to determine distance based on a frequency measurement 603 of the mixed signal. In particular, the round-trip time Δt is given by:

$$\Delta t = \Delta f_{max}/R, \tag{1}$$

the round-trip distance $d_{round-trip}$ is given by:

$$d_{round-trip} = c \times \Delta t, \tag{2}$$

and the distance of the target $d_{target}$ is given by half the round-trip distance:

$$d_{target} = (c \times \Delta t)/2, \tag{3}$$

Where the target is moving, a Doppler shift in the optical frequency of the returned light occurs, where the Doppler shift is based on the speed v of the target. In this case, the processing unit 105 may be configured to determine the speed and the distance of a target based on reflected light having the same or substantially the same time-varying frequency deviation. FIG. 6B illustrates the optical frequency of the local light 601 and the received light 604 (top) and the frequency difference Δf 605 (bottom) over time. In case of the frequency deviation varying according to a sawtooth waveform, the frequency difference 603 alternates between an upper value $\Delta f_{upper}$ and a lower value $\Delta f_{lower}$ in between momentary drops to zero frequency difference over time. The processing unit 105 may be configured to determine the target's distance as in the case where the target is not moving, but replacing $\Delta f_{max}$ by the mean of $\Delta f_{upper}$ and $\Delta f_{lower}$. In addition, the processing unit 105 may be configured to determine the target's speed v by.

$$v = \frac{(f_{upper} - f_{lower})\lambda}{2\cos\theta} \tag{4}$$

where λ is the instantaneous wavelength, and θ is the angle between the target velocity vector and the beam direction of the outgoing light.

It should be noted that Equations (1)-(4) are also applicable to determining the delay (hence target distance) and velocity of a target where the outgoing light includes a time-varying intensity profile in the form of aperiodic intensity modulation, where the aperiodic intensity modulation includes a linear chirp varying in a sawtooth pattern akin to the top diagram of FIG. 6A. In this instance, the associated output of the electrical or digital heterodyne detection resembles the bottom graph of FIG. 6A, with the "optical frequency" now denoting the frequency of the intensity modulation (e.g. varying between 10 MHz and 100 MHz), Δf now denoting the difference in frequency of intensity modulation between the local and reflected light, and R now denoting the chirp rate.

In this example, where the frequency deviation includes a specific frequency chirp characteristic (e.g. the known rate R), the processing unit 105 may perform signal processing on the received light to inhibit detection of non-reflected light (e.g. spoofed light). In one arrangement, the processing unit 105 is configured to determine whether the frequency difference 603 remains relatively constant at $\Delta f_{max}$ (or remaining relatively constant at $\Delta f_{upper}$ and $\Delta f_{lower}$ if a certain Doppler shift is to be allowed) for the approximate duration of the plateaus at $\Delta f_{max}$ represented in FIG. 6A (or the upper and lower plateaus at $\Delta f_{upper}$ and $\Delta f_{lower}$ represented in FIG. 6B). If the determination is negative, the processing unit 105 may disallow light detection by the light receiver 104 based on the negative determination to inhibit the detection of any non-reflected light. In another arrangement, to allow for any Doppler shift due to reflected light off a moving reflecting surface, the processing unit 105 is configured to determine whether the frequency difference 603 remains at $\Delta f_{upper}$ and $\Delta f_{lower}$ for the approximate duration of the upper and lower plateaus at $\Delta f_{upper}$ and $\Delta f_{lower}$ represented in FIG. 6B. If the determination is negative, the processing unit 105 may disallow light detection by the light receiver 104 based on the negative determination to inhibit the detection of any non-reflected light.

Temperature Monitoring

The wavelength stability of laser diodes is temperature-dependent. In some arrangements, the laser diode (or its packaging or mounting) includes an etalon module, which facilitates tracking changes in wavelength due to ambient temperature changes. The etalon module may include an etalon, which consists of two partially reflective and substantially parallel interfaces, optically coupled to a light intensity detector. The light intensity detector generates an electrical signal based on the intensity of light transmitted or reflected by the etalon. It has been known that the reflectivity and transmissivity of an etalon are highly sensitive to temperature changes (see, for example, Appl Opt. 1971 Sep. 1; 10(9):2065-9). The intensity of the light detected by the light intensity detector therefore provides an indication of the temperature changes in or near the etalon. The processing unit 105 may be configured to receive temperature-related information from the etalon module. Based on the temperature-related information, the processing unit 105 may provide a feedback signal to the light source 102 to wavelength-compensation due to any temperature drift. This feedback mechanism relaxes the requirements of the light source 102 by, for example, eliminating the need for an active temperature control.

Environmental-Effects Monitoring

In an arrangement where the beam director 103 is remote from the central unit (such as that in FIG. 1C), it may also be beneficial to obtain environment-related information from the remote beam director to characterise the environment-related effects which the remote beam director is subject to. For those arrangements where the beam director 103 includes two spatially dispersive elements for spatially dispersing light into two substantially orthogonal directions, the beam director 103 may further include in one of the two spatially dispersive elements a cavity for obtaining environment-related information. Like an etalon, the cavity's reflectivity and transmissivity can be highly sensitive to temperature or other physical effects, such as stress.

For example, referring to FIG. 3B, the cavity may be formed by partially reflected coatings in a region of the second spatially dispersive element 303 to which light emitted at wavelength from $\lambda_{11}$ to $\lambda_{20}$ (i.e. the second row of pixels) from the light source 102 would be directed. In this example, the wavelengths $\lambda_{11}$ to $\lambda_{20}$ are designated for monitoring environmental-related effects. When environmental-related information, such as temperature or stress information, is desired at a particular time, the processing unit 105 may be configured to cause the light source 102 to emit any one of the wavelengths $\lambda_{11}$ to $\lambda_{20}$. Such emitted light when directed by the beam director 103 reaches the cavity (instead of the environment). The intensity of light reflected by the cavity (instead of the environment) and subsequently received by the light receiver 104 provides environmental-related information at or near the cavity.

For example, in an automotive application, the system is required to operate in an extended range of temperatures (e.g. −40 to +60 degree Celsius), where passive components in the beam directors may also change properties with temperature. Slight mismatches in the thermal expansion coefficient of different optical materials or glues may introduce stress and changes in the passive optics leading to undesirable effects such as optical misalignment. Since these temperature-related effects will be different for different parts, there may be a need to characterise them at the time of manufacture to calibrate these effects away during operation. If this calibration is performed over temperature, obtaining temperature information at time of operation will allow the system to be temperature-compensated based on the calibration.

Now that arrangements of the present disclosure are described, it should be apparent to the skilled person in the art that the described arrangements have the following advantages:

The use of a wavelength-dependent beam director directs the outgoing light in a direction based on wavelength, requiring no moving parts and with no or little inertia to improve the speed of beam re-direction.

In arrangements where the intensity profile is varied over time, compared with techniques measuring a time delay of optical pulses, which may require the use of photodetectors of fast response time (of the order of 1 ns) due to the use of short optical pulses for improved time resolution, the use of periodic modulation or code modulation (together with phase-shift or autocorrelation detection method) reduces the response time requirements on the light receiver to achieve a similar time resolution.

In arrangements where the frequency deviation is varied over time, the, the same wavelength control can be used for frequency deviation and beam direction.

The security or the ability to counter "spoofing" is facilitated by any one or more of the following:

With optical self-heterodyne detection, only light of a specific wavelength received at a specific time (e.g. light receiving window) may be adequately detected. The sequence of wavelength in a specific order may also be used to enhance security.

With modulation, such as periodic or code modulation, only light whose intensity is varied in a specific fashion (such as at a specific frequency or modulated with a specific coding sequence) may be adequately detected.

For beam director(s) having spatially dispersive optics, only light received at from particular direction by the beam director(s) may be adequately routed to the light receiver and thus be adequately detected.

Where the described system is used for line-of-sight communication (e.g. free-space optical or microwave) alignment purposes, the spatial map of the environment may be used for aligning the communication beam (e.g. the optical beam or microwave beam) towards a transceiver. For instance, the transceiver may be marked by a recognisable 3D shape (e.g. donut-shaped). Once the recognisable 3D shape is recognised (e.g. by way of 3D shape recognition software) in the spatial profile of the environment, a line-of-sight communication system may be configured to point to the direction of the recognised transceiver for line-of-sight communication. In the case of free-space optical communication, the very light from light source 102 directed as the outgoing light by beam director 103 may be used for the light source for the free-space optical communication once alignment is achieved. Similarly, the very light received by the light receiver 104 directed as the incoming light by beam director 103 may be used for the light received for the free-space optical communication once alignment is achieved.

It will be understood that the invention disclosed and defined in this specification extends to all alternative combinations of two or more of the individual features mentioned or evident from the text or drawings. For example, modulator means other than SOA or a Mach Zehnder modulator may well be suitable. All of these different combinations constitute various alternative aspects of the invention.

What is claimed is:

1. A spatial profiling system including:
   a light source configured to provide outgoing light having at least one time-varying attribute at a selected one of multiple wavelength channels, the at least one time-varying attribute including a time-varying frequency deviation;
   a beam director configured to spatially direct the outgoing light into one of multiple directions in two dimensions into an environment having a spatial profile, the one of the multiple directions corresponding to the selected one of the multiple wavelength channels;
   a light receiver configured to receive at least part of the outgoing light reflected by the environment; and
   a processing unit configured to determine at least one characteristic associated with the at least one time-varying attribute of the reflected light for estimation of the spatial profile of the environment associated with the corresponding one of the multiple directions,
   wherein the light receiver is configured to inhibit detection of non-reflected light based on a difference in wavelength or modulation between the outgoing light and the non-reflected light.

2. The system of claim 1 wherein inhibiting detection of the non-reflected light includes selecting the selected one of the multiple wavelengths based on a predetermined or randomised sequence of wavelength channels.

3. The system of claim 1 wherein inhibiting detection of the non-reflected light includes de-correlating the received light from the outgoing light and incoherently mixing the de-correlated light with a sample of the outgoing light.

4. The system of claim 1 wherein inhibiting detection of the non-reflected light includes performing optical self-heterodyne of the received light with a sample of the outgoing light during a time window within which the light source is configured to provide the sampled light at the selected one of multiple wavelength channels.

5. The system of claim 1 wherein the light source is configured to provide additional outgoing light having the same or a different time-varying attribute(s) at additionally selected one or more of the multiple wavelength channels in a sequential manner, the beam director is configured to direct the additional outgoing light into the corresponding one or more of the multiple directions in the sequential manner, and the processing unit is configured to determine the at least one characteristic associated with the same or the different time-varying attributes of the reflected light at the additionally selected one or more of the multiple wavelength channels, for estimation of the spatial profile of the environment associated with the corresponding one or more of the multiple directions.

6. The system of claim 5 wherein the sequential manner includes a predetermined sequence and wherein inhibiting detection of the non-reflected light includes selecting the selected one of the multiple wavelengths based on the predetermined sequence.

7. The system of claim 5 wherein the sequential manner includes a randomised sequence and wherein inhibiting detection of the non-reflected light includes selecting the selected one of the multiple wavelengths based on the randomised sequence.

8. The system of claim 1 wherein the beam director includes reversible optics for (a) spatially directing an outgoing collinear beam from the light source into the multiple directions and (b) spatially directing the reflected light in multiple reversed directions into an incoming collinear beam.

9. The system of claim 8 wherein the reversible optics include a spatially cross-dispersive module.

10. The system of claim 9 wherein the spatially cross-dispersive module includes two spatially dispersive elements in an orthogonal arrangement, each being arranged to steer the outgoing light into respective one of the two dimensions.

11. The system of claim 10 wherein one or both of the two spatially dispersive elements include a photonic crystal structure.

12. The system of claim 8, wherein the reversible optics are arranged to that the reflected light shares at least part of an optical path of the outgoing light within the beam director.

13. The system of claim 8 wherein the system further includes non-reversible optics for routing the outgoing light from the light source to the beam director, and for routing the reflected light from the beam director to the light receiver.

14. The system of claim 1 wherein the beam director is one of multiple beam directors, each of which is (a) optically coupled to the light source and the light receiver, and (b) configured to direct the outgoing light to a respective environment having a respective spatial profile in response to a respective subset of the multiple wavelength channels.

15. The system of claim 14 wherein the light receiver is one of multiple light receivers, and the beam directors are each optically coupled to the light source and the respective one of the multiple light receivers.

16. The system of claim 1 wherein the time-varying frequency deviation includes a linear change in optical frequency.

17. The system of claim 1 wherein the processing unit is further configured to determine at least another characteristic of the reflected light for estimation of a speed of a target in the environment.

18. The system of claim 1, wherein the processing unit is configured to control a tunable wavelength of the light source to effect both the time-varying frequency deviation and the selection of a wavelength channel of the multiple wavelength channels.

19. A spatial profiling method including the steps of:
   providing, by a light source, outgoing light having at least one time-varying attribute at a selected one of multiple wavelength channels, the at least one time-varying attribute including a time-varying frequency deviation;

spatially directing, by a beam director, the outgoing light into one of multiple directions in two dimensions into an environment having a spatial profile, the one of the multiple directions corresponding to the selected one of the multiple wavelength channels;

receiving, by a light receiver, at least part of the outgoing light reflected by the environment; and determining, by the processing unit, at least one characteristic associated with the at least one time-varying attribute of the reflected light for estimation of the spatial profile of the environment associated with the corresponding one of the multiple directions, wherein the light receiver is configured to inhibit detection of non-reflected light based on a difference in wavelength or modulation between the outgoing light and the non-reflected light.

20. A non-transitory processor-readable medium including instructions, which when executed by a processing unit in a spatial profiling system, cause the system to:

provide, by a light source, outgoing light having at least one time-varying attribute at a selected one of multiple wavelength channels, the outgoing light being spatially directed by a beam director into one of multiple directions in two dimensions into an environment having a spatial profile, the at least one time-varying attribute including a time-varying frequency deviation, the one of the multiple directions corresponding to the selected one of the multiple wavelength channels; and determine, by the processing unit, at least one characteristic associated with the at least one time-varying attribute of at least part of the outgoing light reflected by the environment and received by a light receiver for estimation of the spatial profile of the environment associated with the corresponding one of the multiple directions, wherein the light receiver is configured to inhibit detection of non-reflected light based on a difference in wavelength or modulation between the outgoing light and the non-reflected light.

* * * * *